US009723613B2

United States Patent
Cui et al.

(10) Patent No.: US 9,723,613 B2
(45) Date of Patent: Aug. 1, 2017

(54) CARRIER ALLOCATION APPARATUS, METHOD AND TERMINAL

(71) Applicant: SONY CORPORATION, Tokyo (JP)

(72) Inventors: Qimei Cui, Beijing (CN); Ningyu Chen, Beijing (CN); Liang Zeng, Beijing (CN); Yingni Zhang, Beijing (CN); Jiahui Liu, Beijing (CN)

(73) Assignee: SONY CORPORATION, Tokyo (JP)

( * ) Notice: Subject to any disclaimer, the term of this patent is extended or adjusted under 35 U.S.C. 154(b) by 46 days.

(21) Appl. No.: 14/897,165

(22) PCT Filed: Oct. 31, 2014

(86) PCT No.: PCT/CN2014/090031
§ 371 (c)(1),
(2) Date: Dec. 9, 2015

(87) PCT Pub. No.: WO2015/062542
PCT Pub. Date: May 7, 2015

(65) Prior Publication Data
US 2016/0135187 A1    May 12, 2016

(30) Foreign Application Priority Data

Oct. 31, 2013    (CN) .......................... 2013 1 0532925

(51) Int. Cl.
*H04W 72/04*        (2009.01)
*H04L 5/00*         (2006.01)
(52) U.S. Cl.
CPC ......... *H04W 72/0453* (2013.01); *H04L 5/001* (2013.01); *H04L 5/0064* (2013.01);
(Continued)

(58) Field of Classification Search
None
See application file for complete search history.

(56) References Cited

U.S. PATENT DOCUMENTS

2013/0308567 A1*  11/2013  Chen .................. H04L 5/005
                                                   370/329
2014/0086173 A1*   3/2014  Sadeghi .............. H04L 5/005
                                                   370/329

(Continued)

OTHER PUBLICATIONS

International Search Report issued Feb. 9, 2015, in PCT/CN2014/090031 filed Oct. 31, 2014.

*Primary Examiner* — Andrew Oh
(74) *Attorney, Agent, or Firm* — Oblon, McClelland, Maier & Neustadt, L.L.P.

(57) ABSTRACT

A carrier allocating apparatus including processing circuitry and a method and terminal, where the processing circuitry is configured to: determine a carrier parameter according to parameter information of the terminal, where the carrier parameter is configured to indicate a carrier needed by the terminal, and the carrier parameter includes a carrier type, the carrier type includes a Legacy Carrier Type (LCT) and a New Carrier Type (NCT), where the parameter information of the terminal includes a current carrier configuration of the terminal and a service type; perform a corresponding carrier allocation on the basis of the determined carrier parameter. A demand for a carrier is determined according to parameter information of the terminal, and then the needed carrier is allocated to the terminal. The apparatus can improve quality of service of the terminal in a system and improve user experience.

22 Claims, 11 Drawing Sheets

(52) U.S. Cl.
CPC .......... *H04L 5/0087* (2013.01); *H04L 5/0098* (2013.01); *H04L 5/0048* (2013.01)

(56) References Cited

U.S. PATENT DOCUMENTS

| | | | |
|---|---|---|---|
| 2014/0269368 A1* | 9/2014 | Xu ........................ | H04W 24/00 370/252 |
| 2015/0085833 A1* | 3/2015 | Han ..................... | H04J 11/0069 370/336 |
| 2015/0207549 A1* | 7/2015 | Nagata .................. | H01Q 1/246 370/252 |
| 2015/0208411 A1* | 7/2015 | Mochizuki ........ | H04W 72/1226 455/452.1 |
| 2015/0208420 A1* | 7/2015 | Kashiwase .............. | H04L 5/001 370/230 |
| 2015/0319761 A1* | 11/2015 | Nagata ................ | H04W 72/048 370/329 |
| 2016/0295634 A1* | 10/2016 | Miao ................ | H04W 52/0235 |

* cited by examiner

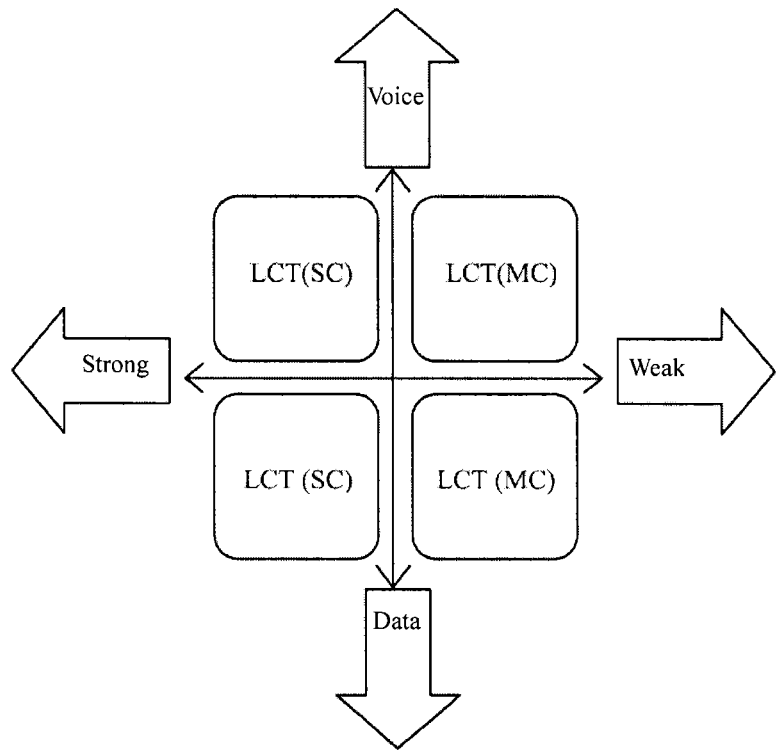

FIG. 13

| determine a carrier parameter according to parameter information of a terminal, wherein the carrier parameter is configured to indicate a carrier needed by the terminal, and the carrier parameter includes a carrier type (including LCT and an NCT), wherein the parameter information of the terminal includes: a current carrier configuration and service type of the terminal | ←S1401 |

| conduct a corresponding carrier allocation based on the determined carrier parameter | ←S1403 |

FIG. 14

CARRIER ALLOCATION APPARATUS, METHOD AND TERMINAL

TECHNICAL FIELD

The present invention relates to the field of mobile communications, and more particularly, to a carrier allocation apparatus, method and terminal.

BACKGROUND

Among the existing mobile communications technologies, Long Term Evolution (LTE), a long term evolution of a universal mobile telecommunications system (UMTS) technical standard formulated by 3GPP, was officially approved and initiated at Toronto 3GPP TSG RAN#26 in December, 2004. Orthogonal Frequency Division Multiplexing (OFDM), multiple-antenna MIMO (Multiple-Input Multiple-Out-put) and other key transmission technologies are introduced in an LTE system, which significantly increases a spectrum efficiency and a data transmission rate (an uplink peak rate can reach 50 Mbit/s, and a downlink peak rate can reach 100 Mbit/s), and supports multiple bandwidth allocations (for example, including: 1.4 MHz, 3 MHz, 5 MHz, 10 MHz, 15 MHz and 20 MHz, etc.), thereby making spectrum allocation more flexible, and significantly improving a system capacity and coverage. In addition, LTE wireless network architecture becomes more flattened, a system time delay is reduced, and a networking cost and a maintenance cost are lowered.

In LTE R12, a small cell is introduced. The small cell is a low-powered wireless access node, and can work at a licensed or unlicensed frequency spectrum. In general, the small cell has a coverage area of 10-200 m. In contrast, a coverage area of a macrocell may reach several kilometers. The small cell integrates a femtocell, a picocell, a microcell and distributed wireless technologies. The small cell may be used indoors or outdoors, and in a practical application scenario, the small cell is much smaller than the macrocell. Generally, the small cell can only cover an area of ten-meter indoor space or two-kilometer outdoor space.

An objective achieved by LTE-A (LTE-Advanced) is to support a downlink peak rate 1 Gbit/s and an uplink peak rate 500 Mbit/s. In order to satisfy this demand, a transmission bandwidth needs to reach 100 MHz. However, in practice available spectrum resources that are continuous and reach the foregoing bandwidth rarely exist. Therefore, LTE-Advanced uses Carrier Aggregation (CA) Technology to aggregate multiple component carriers (CC), thereby achieving a high-bandwidth transmission. A Release 8 LTE carrier supports a maximum bandwidth of 20 MHz. Therefore, LTE-Advanced supports five 20 MHz CCs at the most.

Based on the CA Technology, available carriers include a primary component carrier (Primary Component Carrier, hereinafter referred to as PCC) and a secondary component carrier (Secondary Component Carrier, hereinafter referred to as SCC). The PCC has a control channel, is capable of cross-carrier scheduling the SCC, and may serve as an initial access carrier, whereas the SCC does not have the control channel, and is subjected to a cross-carrier scheduling by the PCC.

At present, types of a carrier are mainly classified into: an LCT carrier type (Legacy Carrier Type, hereinafter referred to as LCT) and a new carrier type (New Carrier Type, hereinafter referred to as NCT).

The LCT refers to a carrier as defined in LTE Release 8, of which bandwidth is fixed, for example, 1.4 MHz, 3 MHz, 5 MHz, 10 MHz, 15 MHz and 20 MHz.

The NCT refers to a new carrier as defined in LTE Release 12, of which bandwidth is not fixed, with multiple bandwidths provided for choice, and with a part of control signal deleted, thus having a higher frequency spectrum utilization efficiency and a bandwidth flexibility.

According to a fact whether or not the NCT may serve as an initial access carrier, the NCT may be classified into a standalone new carrier type (Standalone New Carrier Type, hereinafter referred to as S-NCT) and a non-standalone new carrier type (Non-Standalone New Carrier Type, hereinafter referred to as NS-NCT), wherein the S-NCT itself includes control information, being a substantive NCT independent of a primary carrier, and may serve as the initial access carrier. Whereas the NS-NCT itself does not include control information, shall be subjected to a cross-carrier scheduling by the primary carrier, and cannot serve as the initial access carrier.

In addition, a trend to diversification appears on an LTE service. At present, service types are classified into the following four types:

an unsolicited grant service (Unsolicited grant service, hereinafter referred to as UGS), which is sensitive to a time delay and a transmission rate but insensitive to an error;

a real-time polling service (Real-time polling service, hereinafter referred to as rtPS), which is mainly used in a video streaming and a video conference, tolerant to a longer time delay, and more demanding for a packet error rate;

a non-real-time polling service (Non-real-time polling service, hereinafter referred to as nrtPS), which may be used for a FTP transmission, with major parameters of measurement including: a packet error rate and a minimum transmission rate. In addition, this service is insensitive to a time delay but is more demanding for a packet error rate than the foregoing two services; and a best effort service (Best Effort, hereinafter referred to as BE), which is mainly applied to HTTP and Email, having no requirement (less demanding) for a data rate, and having a upper limit to a packet error rate.

Due to diversity of the current carrier bandwidth/type and the service type and the development of the carrier aggregation technology, no effective solution has been proposed in the art regarding how to allocate a carrier to a terminal so as to satisfy a user's various service demands. Therefore, in most cases, it is not good enough to satisfy a user's service demand using a conventional method, for example, carriers configuration (including types of operating carriers in a current system, and a bandwidth of each type of carrier) used only according to a measurement performances of the carriers.

SUMMARY

Concerning the problem that in related technologies user experience is affected due to failure of a carrier allocating scheme in satisfying a user's demand, the present invention provides a carrier allocation apparatus, method and terminal, which may optimize a carrier configuration and improve user experience.

A technical solution of the present invention is implemented as below:

According to an aspect of the present invention, a carrier allocating apparatus comprising a processing circuitry is provided.

The processing circuitry includes: a determining module, configured to determine a carrier parameter according to parameter information of a terminal, wherein the carrier parameter is configured to indicate a carrier needed by the terminal, and the carrier parameter includes a carrier type comprising a Legacy Carrier Type (LCT) and a New Carrier Type (NCT), and wherein the parameter information of the terminal include a current carrier configuration and a service type of the terminal; and an allocating module, configured to perform a corresponding carrier allocation on the basis of the determined carrier parameter.

According to another aspect of the present invention, a carrier allocating method is provided.

The carrier allocating method includes: determining a carrier parameter according to parameter information of a terminal, wherein the carrier parameters are configured to indicate a carrier needed by the terminal, and the carrier parameters include a carrier type comprising a Legacy Carrier Type (LCT) and a New Carrier Type (NCT), and wherein the parameter information of the terminal includes a current carrier configuration and a service type of the terminal; and performing a corresponding carrier allocation on the basis of the determined carrier parameter.

According to still another aspect of the present invention, a carrier allocating apparatus comprising a processing circuitry is provided.

The processing circuitry includes: a communications module, configured to receive carrier demand information reported by multiple terminals, wherein the carrier demand information indicates a demand of a terminal for a carrier, the demand of a terminal for a carrier is obtained on the basis of parameter information of the terminal, and the parameter information includes at least one of the followings: a current carrier configuration and a service type of the terminal, and signal receiving quality of signals from various cells of the terminal, wherein the carrier demand information comprises a carrier parameter of a carrier needed by the terminal, the carrier parameter comprises a carrier type and a cell corresponding to the carrier, and the carrier type comprises a Legacy Carrier Type (LCT) and a New Carrier Type (NCT); a system carrier management module, configured to adjust a current carrier configuration in a system according to demands of multiple terminals for carriers; and an allocating module, configured to allocate, on the basis of an adjusted system carrier configuration, the carrier to the terminal.

According to another aspect of the present invention, a carrier allocating method is provided.

The carrier allocating method includes: receiving carrier demand information reported by multiple terminals, wherein the carrier demand information indicates a demand of a terminal for a carrier, the demand of a terminal for a carrier is obtained on the basis of parameter information of the terminal, and the parameter information includes at least one of the followings: a current carrier configuration and a service type of the terminal, and signal receiving quality of signals from various cells of the terminal, wherein the carrier demand information includes a carrier parameter of a carrier needed by the terminal, the carrier parameter includes a carrier type and a cell corresponding to the carrier, and the carrier type includes a Legacy Carrier Type (LCT) and a New Carrier Type (NCT); adjusting the current carrier configuration in a system according to demands of the multiple terminals for carriers; and allocating, on the basis of the adjusted system carrier configuration, the carrier to the terminal.

According to another aspect of the present invention, a terminal is provided.

The terminal includes: a determining module, configured to determine carrier demand information of the terminal according to parameter information of the terminal, wherein the carrier demand information is configured to indicate a demand of the terminal for a carrier, the parameter information includes at least one of the followings: a current carrier configuration, a service type, and signal receiving quality of signals from various cells, wherein the carrier demand information includes a carrier parameter of the needed carrier, the carrier parameter includes a carrier type and a cell corresponding to the carrier, and the carrier type includes a Legacy Carrier Type (LCT) and a New Carrier Type (NCT); and a communications module, configured to send the carrier demand information to a network side.

According to another aspect of the present invention, a method for reporting a carrier demand is provided.

The method for reporting a carrier demand includes: determining carrier demand information of a terminal according to parameter information of the terminal, wherein the carrier demand information is configured to indicate a demand of the terminal for a carrier, the parameter information includes at least one of the followings: a current carrier configuration, a service type, and signal receiving quality of signals from various cells, wherein the carrier demand information includes a carrier parameter of the needed carrier, the carrier parameter includes a carrier type and a cell corresponding to the carrier, and the carrier type includes a Legacy Carrier Type (LCT) and a New Carrier Type (NCT); and sending the carrier demand information to a network side.

In the present invention, a demand for a carrier is determined according to parameter information of the terminal, and then the needed carrier is allocated to the terminal. The present invention can effectively improve quality of service of the terminal in a system and improve user experience.

BRIEF DESCRIPTION OF DRAWINGS

To describe the technical solutions in the embodiments of the present invention or in the prior art more clearly, the following briefly introduces the accompanying drawings required for using in the embodiments. Apparently, the accompanying drawings in the following description show merely some embodiments of the present invention, and those of ordinary skill in the art may still derive other drawings from these accompanying drawings without creative efforts.

FIGS. 6-13 are schematic diagrams for determining a carrier type in multiple different scenarios according to the carrier allocating scheme in an embodiment of the present invention;

FIG. 14 is a flowchart of the carrier allocating method according to the embodiment of the present invention;

DETAILED DESCRIPTION OF THE EMBODIMENTS

The technical solutions in the embodiments of the present invention will be clearly and completely described with reference to the accompanying drawings in the embodiments of the present invention. Obviously, the embodiments as recited herein are merely a part of embodiments of the present invention instead of all the embodiments. On the basis of the embodiments of the present invention, all other embodiments obtained by those of ordinary skill in the art shall fall within the protection scope of the present invention.

As recited in the background art, the current user service types are diversified. In addition to the foregoing classification, different classification results may be obtained according to different criteria. For example, according to the requirements of a service for instantaneity and continuity, services may be classified into: a voice conversation service and a network data service.

A bandwidth occupied by the voice conversation service (also known as a voice service herein) is relatively stable. In addition, the voice conversation service, which is sensitive to a time delay and a handover, mainly includes, for example, a voice service, a VoIP service and the like. For the network data service (also known as a data service herein), differences in bandwidths required by different services of the same type may be relatively large. The network data service, which is sensitive to a transmission rate and a bit error ratio, mainly includes, for example, background downloading, and web browsing, etc.

Figure 1A:
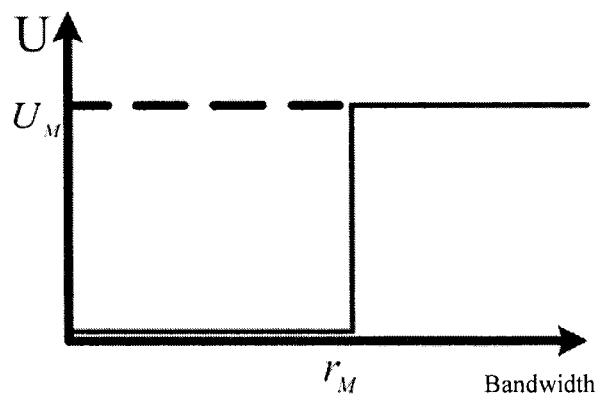
FIG. 1a and FIG. 1b are schematic diagrams of a relation between change of bandwidth and service experiences of a voice conversation service and a network data service.
Figure 1B:
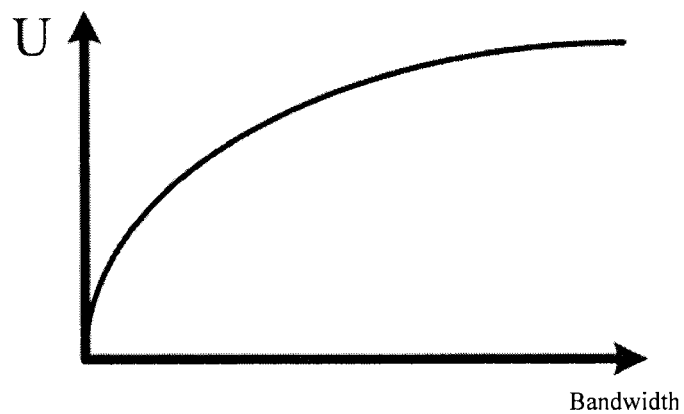

FIG. 1a and FIG. 1b respectively show a relation between change of bandwidth and user experience of the two types of services.

In FIG. 1a and FIG. 1b, an ordinate U stands for a user experience value, the higher the value is, the more satisfied a user is, and an abscissa stands for a bandwidth.

FIG. 1a shows a relation between change of bandwidth and user experience of the voice conversation service.

It may be seen from FIG. 1a that the bandwidth of the voice conversation service has a threshold value, when the bandwidth is below the threshold, conversation is not supported and the user experience is poor; when the bandwidth is above the threshold, conversation is available and the user experience is good. However, if a bandwidth allocated to the voice conversation service exceeds the threshold value, the user experience cannot be improved continuously even though the bandwidth is continuously increased.

FIG. 1b shows a relation between change of bandwidth and user experience of the network data service. It may be seen from FIG. 1b that for the network data service, the user experience will be continuously improved as the bandwidth is increased, that is, the larger the bandwidth allocated to a user is, the faster network data obtained by the user is, and the better the user experience is.

Therefore, it is believed that requirements for carrier configuration of different services are different (including requirements for a bandwidth, a carrier type, a cell corresponding to a carrier or the like). In the case where the quantity of mobile terminals in the network is larger, it inevitably causes service requirements to become quite complex. Furthermore, capabilities, for supporting a carrier, of various mobile terminals in the network are discrepant. For example, some terminals support the carrier aggregation technology, whereas some terminals do not support the carrier aggregation technology; some terminals support an NCT, whereas other terminals may only use an LCT, which further improves a complexity in carrier allocation.

Based on the above considerations, embodiments of the present invention are put forward, and a carrier allocating apparatus comprising a processing circuitry is provided.

Figure 2:
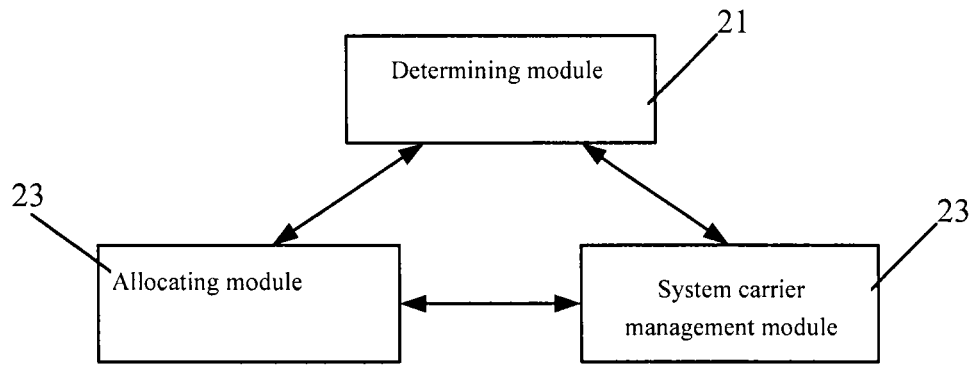
FIG. 2 is a block diagram of the carrier allocating apparatus according to an embodiment of the present invention.

As shown in FIG. 2, the processing circuitry is configured to include according to an embodiment of the present invention:

a determining module 21, configured to determine a carrier parameter according to parameter information of a terminal (also known as a mobile station hereinafter), wherein the carrier parameter is configured to indicate a carrier required by the terminal (for example, including: at least one of a type of the required carrier, a type or a specific number of a cell corresponding to the required carrier, a bandwidth of the required carrier and a corresponding demand degree, wherein the carrier type may include an LCT carrier type (LCT) and a new carrier type (NCT)), wherein the parameter information of the terminal includes at least: the current carrier configuration and a service type of the terminal, in addition, the parameter information of the terminal may further include signal receiving quality of various cell signals and information on the capability of the terminal in supporting a carrier or the like; and an allocating module 23, configured to perform, on the basis of the determined carrier parameter, a corresponding carrier allocation.

The carrier allocating apparatus according to the present invention may further include a system carrier management module 22, configured to manage carrier configuration in a system. For example, items of management content may mainly include: the quantity and distributions (for example, in a cell corresponding to an open carrier) of carriers in the system, types of various carriers and/or bandwidths of various carriers, etc. According to an embodiment, when carrier resources in the current system are not enough to satisfy demands for the terminals in the system, the system carrier management module 22 may manage carrier configuration in the system, so as to provide sufficient carrier resources to be allocated by the allocating module 23. Specifically, the system carrier management module 22 may determine, on the basis of demands of at least one terminal for a carrier, which are determined by the determining module 21 according to the parameter information of the at least one terminal in the system, an expected carrier configuration in the system.

The parameter information of the terminal needs to be taken into account, whether a carrier allocation is performed or the expected carrier configuration is determined. The quantity of the terminals to be taken into account may be one or more; and the terminals to be taken into account may be all terminals in the system or a part of terminals in the system. For example, according to an optional embodiment, a priority may be give to a terminal whose quality of service cannot be satisfied and/or a terminal which has experienced the maximum gain after a carrier allocation is adjusted, thereby adjusting the carrier configuration of the system or performing a carrier allocation according to demands of these terminals. In addition, according to an embodiment of the present invention, the system carrier management module 22 may also adjust the current carrier configuration according to the expected carrier configuration of the system, for example, by at least one of the following adjustments: adjusting a type and/or a bandwidth of a carrier in the system, adding a carrier, and switching off a carrier.

It should be noted that if the carrier allocating apparatus has administration authority over all carriers in the system, for example, if the carrier allocating apparatus is disposed at a macro base station having a larger coverage area, and has administration authority over small base stations within the scope thereof, the carrier allocating apparatus may allocate all carriers in the system including macro base stations and small base stations or carry out managements of carrier configurations thereof. If the carrier allocating apparatus only has administration authority over a part of carriers in the system, for example, if the carrier allocating apparatus is disposed at a small base station, the carrier allocating apparatus can only control a carrier transmitted by the small base station, and the carrier allocating apparatus needs to send a request to a base station corresponding to a carrier beyond authority control of the apparatus when the apparatus needs to allocate or manage other carriers in the system.

In addition, for the determining module 21 in the carrier allocating apparatus, when the carrier type needed by the terminal is to be determined, if the parameter information of the terminal includes the current carrier configuration and service type information of the terminal, it is enough to determine the carrier type needed by the current service type of the terminal. Moreover, if the parameter information further includes capability of the terminal in supporting a carrier, when the carrier type needed by the terminal is to be determined, the determining module 21 will not take a carrier type that is not supported by the terminal into account. In addition, if the parameter information further includes signal receiving quality of the terminal for different cells, the determining module 21 may determine which of base stations are better in quality of communications with the terminal, thereby determining that the terminal is in a priority need of carriers from which cells. In other embodiments, other contents are added into the parameter information of the terminal, serving as a basis for determining the demand of the terminal for a carrier.

When a carrier needed by the terminal is to be determined according to a service type, the carrier type needed by the terminal is determined according to the classification of services and the current service type of the terminal. In an embodiment, services may be classified into a voice service (it can be interpreted as the foregoing voice conversation service) and a data service (it can be interpreted as the foregoing network data service). In consideration of characteristics (for example, relatively sensitive to a handover) of the voice service, for the terminal carrying out the voice service, the determining module 21 determines that the terminal is in a priority need of an LCT carrier, which has a wide coverage area, thus selecting and applying the LCT carrier to the voice service may at least reduce a switching frequency. In consideration of characteristics (for example, relatively large change of demand for bandwidth) of the data service, for the terminal carrying out the data service, the determining module 21 determines that the terminal is in a priority need of an NCT carrier, which is unfixed in bandwidth, relatively flexible in configuration and high efficiency in frequency spectrum utilization, thus being able to better satisfy demands for the data service.

In other embodiments, services of the terminal may be classified by using other manners. For example, the voice service or the data service may be further subdivided. However, a preferred carrier type may be determined according to the embodiments of the present invention as long as the specifically-divided service type belongs to the voice service or the data service. According to an embodiment of the present invention, the carrier allocating apparatus of the present invention may further include a storage module configured to store a service-carrier type list, wherein the service-carrier type list may include various service types and a corresponding relation between the service types and preferred carrier types thereof, and the determining module 21 may determine, by querying the service-carrier type list stored in a storage device, the carrier type needed by the terminal of the current service type.

The above describes the scheme for determining the carrier type needed by the terminal by reference to the service type of the terminal. In order to further improve the quality of service of the terminal and improve the user experience, a source of a needed carrier may be determined according to the signal receiving quality of the terminal during receiving signals transmitted by various cells.

In order to determine the source of the carrier, the parameter information of the terminal may further include the signal receiving quality of the terminal during receiving signals transmitted by different cells. The determining module 21 may determine, according to signals receiving quality of a macrocell signal and a small cell signal respectively received by the terminal, that the terminal is in a priority need of a macrocell carrier or a small cell carrier, i.e., either a macrocell or a small cell is determined to be a cell type corresponding to the needed carrier. Specifically, if the signal quality of a macrocell signal received by the terminal is superior to that of a small cell signal, it is determined that the terminal is in a priority need of a macrocell carrier; otherwise, if the signal quality of a small cell signal received by the terminal is superior to that of a macrocell signal, it is determined that the terminal is in a priority need of a small cell carrier. In addition, if the terminal receives multiple macrocell signals or small cell signals, it is possible to determine, according to the signal receiving quality, a specific cell corresponding to the needed carrier, for example, a cell of which signal receiving quality is better. In an embodiment, the signal receiving quality is represented by a reference signal receiving quality (Reference Signal Receiving Quality, hereinafter referred to as RSRQ). In another embodiment, the signal receiving quality is represented by a retransmission probability. In other embodiments, other parameters able to represent the signal receiving quality may serve as a basis for determining a demand of the terminal for a carrier. And, the foregoing parameters configured to represent the signal receiving quality may be combined for use.

For example, given that the current system includes a macrocell and a small cell, the signal receiving quality of the terminal during receiving a signal transmitted by the small cell is superior to that of the terminal during receiving a signal transmitted by the macrocell, and the service type of the terminal is a voice service, under the circumstances, the determining module 21 may determine that an LCT carrier from the small cell is the currently needed carrier of the terminal.

In another scenario, given that the current service type of the terminal is a data service, and the signal receiving quality of the terminal during receiving a signal transmitted by a small cell is superior to that of the terminal during receiving a signal transmitted by a macrocell, since the data service is sensitive to a bit error ratio and a transmission rate, it is determined that the terminal is in a priority need of a carrier from the small cell, and the carrier from the small cell is an NCT carrier, for example, an NS-NCT. In this case, a carrier aggregation is performed on the LCT from the macrocell and the NS-NCT, afterward a corresponding carrier is allocated to the terminal. However, after the carrier allocation, and after a monitoring is performed on a channel quality of the terminal, if it is discovered that a retransmission frequency in receiving a signal by means of the NS-NCT carrier is higher (for example, higher than a predetermined value), and if the signal receiving quality of the terminal during receiving a signal transmitted by the small cell is still superior to that of the terminal during receiving a signal transmitted by the macrocell, it is determined that the terminal needs the LCT carrier from the small cell.

According to another embodiment of the present invention, the determining module 21 may also determine, according to the service type and the current carrier configuration of the terminal, a newly-added bandwidth needed by the terminal, and determine, according to a relation between the newly-added bandwidth and the fixed bandwidth of the LCT carrier, the carrier type needed by the terminal. Specifically, for example, if the newly-added bandwidth is not the fixed bandwidth of the LCT carrier, such as 1.4 MHz, 3 MHz, 5 MHz, 10 MHz, 15 MHz or 20 MHz, or the newly-added bandwidth cannot be obtained from combination of these carrier bandwidths, it is determined that the needed carrier type includes an NCT. For example, if it is determined that a bandwidth of 4.7 MHz needs to be newly added according to a demand of the terminal, an LCT carrier bandwidth combination most approximate to the bandwidth demand is 4.4 MHz or 5 MHz, if using 4.4 MHz is not enough to satisfy the demand but using 5 MHz will cause a certain waste of resources, using the NCT or a combination of the NCT and the LCT, which is more flexible in bandwidth configuration, may not only satisfy the demand but also save bandwidth resources. Further, the determining module 21 may also determine, according to the newly-added bandwidth and the LCT bandwidth, the needed NCT bandwidth or bandwidth of NCT+LCT.

In addition, in an embodiment, in the parameter information of the terminal, information on the capability of the terminal in supporting a carrier is configured to indicate which types of carriers are supported by the terminal, particularly, indicate a type of the capability of the terminal in supporting a carrier. For example, capability information may be configured to be two types as shown in Table 1, namely, Type A that supports an NCT and Type B that does not support an NCT. When the carrier type needed by the terminal is be determined, the carrier type needed by the terminal may be determined according to the capability information. For example, for a terminal of which capability type is A, on the basis of different service types, the carrier type (may be allocated to the terminal) needed by the terminal may be an NCT carrier or an LCT carrier; for a terminal of which capability type is B, the carrier type (may be allocated to the terminal) needed by the terminal may only be an LCT carrier. In addition, types of the capability of the terminal in supporting a carrier may be divided according to a manner as shown in Table 2, namely, it is further divided into supporting CA or not supporting CA, and the type that supports an NCT may be further divided into supporting NS-NCT or S-NCT. According to the terminal capability types in an example as shown in Table 2, more concrete allocable carrier type information (including carrier types and a combination manner of the carrier types) may be determined. In other embodiments, with the development of technologies, more carrier types and carrier combination forms may appear, in this case, other capability division manners may be employed.

TABLE 1

| Capability type | Carrier type supported | Allocable carrier type |
| --- | --- | --- |
| A | NCT | NCT and LCT |
| B | LCT | LCT |

TABLE 2

| Capability type | Whether or not to support CA | Whether or not to support NCT/NS-NCT/S-NCT | Allocable carrier type |
| --- | --- | --- | --- |
| A1 | Supporting | Supporting NS-NCT | LCT + NS-NCT or LCT |
| A2 | | Supporting S-NCT | S-NCT or S-NCT + LCT or LCT |
| B | | Not supporting NCT | LCT or LCT + LCT |
| C | Not supporting | Supporting S-NCT | S-NCT or LCT |
| D | | Not supporting | LCT |

In addition, in order to facilitate determining the carrier needed by the terminal, the determining module 21 may be further configured to quantize a degree of demand of the terminal for at least one carrier. It is possible to divide the carrier in consideration of the carrier type and a type of a cell corresponding to the carrier, and to determine the degree of demand for at least one carrier obtained from division. For example, each combination of a macrocell, a small cell, an NCT and an LCT corresponds to a carrier parameter. Specifically, the LCT from the macrocell is a carrier parameter, and the NCT from the small cell is another carrier parameter.

In an embodiment, the determining module 21 may assess and assign a value to each of carrier parameters, according to terminal parameters (for example, the service type, the signal receiving quality, the capability in supporting a carrier or the like), and the assigned value is configured to indicate an degree of demand of the terminal for the carrier corresponding to the carrier parameter. Specifically, a carrier assignment scheme may be as below: the larger the value is, the higher the degree of demand of the terminal for the carrier is; the smaller the value is, the lower the degree of demand of the terminal for the carrier is (in a contrary embodiment, the smaller the value is, the higher the degree of demand of the terminal for the carrier is). In another embodiment, the determining module 21 may assign "1" or "0" to each of the carrier parameters. For example, "1" is assigned to a carrier type that is needed by the terminal, whereas, "0" is assigned to a carrier type that is not needed by the terminal (vice versa). In another embodiment, "1" is only assigned to a carrier parameter that is needed by the terminal, whereas, no value is assigned to a carrier parameter that is not needed by the terminal (during determining a carrier configuration subsequently, a carrier parameter to which no value is assigned is regarded as the terminal not needing a carrier corresponding to the carrier parameter). In other embodiments, three or more different numerical values may be used to indicate the degree of demand of the terminal for a carrier corresponding to each of the carrier parameters.

As mentioned above, according to the terminal in this embodiment, all or a part of terminals in the system may be taken into account, and then demands for these terminals are determined, thereby adjusting the carrier configuration. When an expected carrier configuration is determined, for each type of the carrier parameters, a sum of all the values assigned by all of the considered terminal to this type of carrier parameter may be computed, so as to determine a total demand of the considered terminals for this type of carrier parameter (a carrier parameter to which no value is assigned is regarded as 0 being assigned to this carrier parameter). In this way, it is possible to determine all of the total sums of the values respectively corresponding to different types of carrier parameters, and by making comparisons among different total sums for different types of carrier parameters (herein, different types of carrier parameters may correspond to different types of carriers distinguished according to a combination of a carrier type and a type of a cell corresponding to the carrier, rather than only according to different carrier types), it is possible to determine the degree of demand for each type of the carriers, and according to which it is possible to determine the carrier and/or the expected carrier configuration needed by the terminal, and then, it is possible to allocate, according to a determined result, the carrier to the terminal, and/or to adjust the carrier configuration in the system.

As mentioned above, when the carrier is to be allocated, it is possible to take all or a part of terminals in the system into account, or give priority to a terminal of which current service demand cannot be satisfied and/or a terminal of which user experience can be improved maximally. The current service experience of the terminal may be learned in multiple ways (for example, according to the parameter information (including the service type or the like) of the terminal, and the carrier currently connected to the terminal). Therefore, for each terminal, it is possible to determine whether the current service of the terminal can be satisfied, and/or which type of carrier may be used so as to maximally improve the terminal experience. When the carrier configuration in the system is to be adjusted by the system carrier management module 22, it is possible to give priority to a terminal of which service experience is poor and/or a terminal of which service experience may be significantly improved by means of minor carrier adjustment, so as to determine the expected carrier configuration for improving services of these terminals, and avoiding exerting a negative impact on other terminals.

When the carrier configuration in the system is to be adjusted by the system carrier management module 22, it is possible to consider avoiding making an excessive adjustment of the carrier configuration in the system. In an embodiment, supposing the larger the total sum of the assigned values corresponding to a carrier parameter is, the higher the degree of demand for the carrier parameter is. Optionally, a first threshold may be set, and if the total sum of the assigned values corresponding to a carrier parameter is higher than the first threshold, this means that the carrier corresponding to the carrier parameter is the carrier urgently needed by the current system. Hence, when the expected carrier configuration is to be determined, the carrier parameter is only taken into account, of which total sum of the assigned values is higher than the first threshold. In another embodiment, a second threshold may be set, and if the total sum of the assigned values corresponding to a carrier parameter is lower than the second threshold, this means that the degree of demand for the carrier parameter is quite low. For example, after demands of all terminals in the system are counted, if the total sums of assigned values corresponding to some type of carrier parameters obtained are lower than the second threshold, carriers corresponding to these types of carrier parameters may be switched off. In addition, the foregoing first threshold and the second threshold may be combined for use. In other embodiments not enumerated, more thresholds configured to measure the degree of demand for a carrier may be set.

In practical application, the carrier allocating apparatus according to the embodiments of the present invention may acquire service experience of all or a part of terminals in the system. In the case where the service experience of a majority of terminals in the system is poor (for example, the number of users corresponding to this part of terminals is greater than a predefined numerical threshold, or the proportion of this part of users is greater than a predefined proportional threshold), the system carrier management module 22 is triggered to determine the expected carrier configuration, so as to adjust the current carrier configuration. In addition, the apparatus according to the embodiments of the present invention may also perform an initial configuration and allocation of carriers when a cell is connected to the network. In the prior art, it is unable to reasonably determine carrier configuration in a system, therefore the carrier configuration in the system is unable to satisfy a service demand, not to mention adapting to a service change of terminals, and a large number of terminals with different capacities in the system being connected to the network due to mobility of the terminals. By means of the technical solution of the present invention, adjustment of the carrier configuration may be triggered if necessary, thereby effectively adapting to changes of services and terminals.

In addition, adjustment by the system carrier management module 22 on the current carrier configuration in the system may include at least one of the followings: adjusting the type and/or the bandwidth of a carrier in the system, adding a carrier, and switching off a carrier. When the current carrier configuration is to be adjusted, the total bandwidth may be increased or reduced, one type or several types of carriers may be switched off, or bandwidths of these carriers may be reduced, and bandwidths of another type or several types of carriers may be accordingly increased, or one type or several types of carriers may be added to occupy these bandwidths.

The technical solution of the present invention may implement a reasonable allocation of carriers (including adjustment of carrier configuration), improve a service experience, and adapt to a demand of LTE-A key technologies in allusion to setting of NCT in Release 12.

The following will describe the solution of the present invention with reference to specific examples.

For example, when a base station needs to newly add a carrier on account of a certain demand, it is necessary to determine whether the type of the carrier is an LCT, an S-NCT or an NS-NCT. In the present invention, a carrier allocation may be performed according to a service type, a carrier bandwidth, a channel quality and a mobile station capacity.

When the carrier configuration is to be determined, the considered factors may include: the type of the mobile station, the carrier bandwidth, a channel indication and the service type. Sequences of these factors are not fixed, and may be adjusted according to the actual situation.

Figure 3:
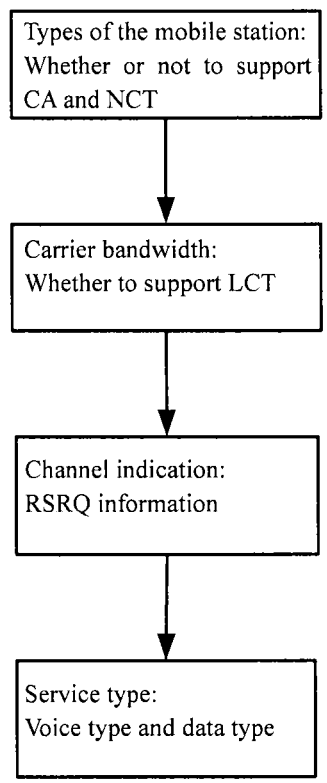
FIG. 3 is a flowchart of a specific example for determining which carrier type to be added on the basis of a judgment of multiple factors, according to a scheme in an embodiment of the present invention.

For example, first of all, it is judged whether the terminal supports an LCT (remaining resources of an actual bandwidth need to be consider because the bandwidth of the LCT cannot be changed at random) according to the type of the mobile station and the carrier bandwidth with reference to the sequences as shown in FIG. 3, then according to the channel indication (for example, RSRQ or a retransmission probability), it is judged whether the service type of the terminal is a voice service or a data service, thereby determining the carrier type to be add for the terminal, and then serving as a basis of the final carrier allocation.

A judgment for the type of the mobile station is as below: if the mobile station supports an NCT, the newly-added carrier may be allocated to the NCT or the LCT. Otherwise, the newly-added carrier may only be the LCT.

A judgment for the carrier bandwidth is as below: if the newly-added bandwidth is not 1.4 MHz, 3 MHz, 5 MHz, 10 MHz, 15 MHz or 20 MHz, or cannot be combined by these carriers, the newly-added carrier preferably is the NCT (in a concrete judgment, it is further considered whether the terminal to which a bandwidth is newly add supports the NCT). Otherwise, to be the NCT or the LCT depends on the following steps.

A judgment for the channel indication is as below: if an interference with the newly-added carrier is so large that it is unable to correctly demodulate a control signal of the newly-added carrier, the newly-added carrier shall be aggregated, as a secondary component carrier, with a primary component carrier, so as to reduce the interference with the control signal by means of cross-carrier scheduling. In addition, if the interference with the primary component carrier is increased, the newly-added carrier shall be changed into the primary component carrier.

A judgment for the service type is as below: if the service type of the newly-added component carrier is a voice type, the LCT is allocated preferentially. The NCT is allocated preferentially if the service type of the newly-added component carrier is a data type.

Figure 4:
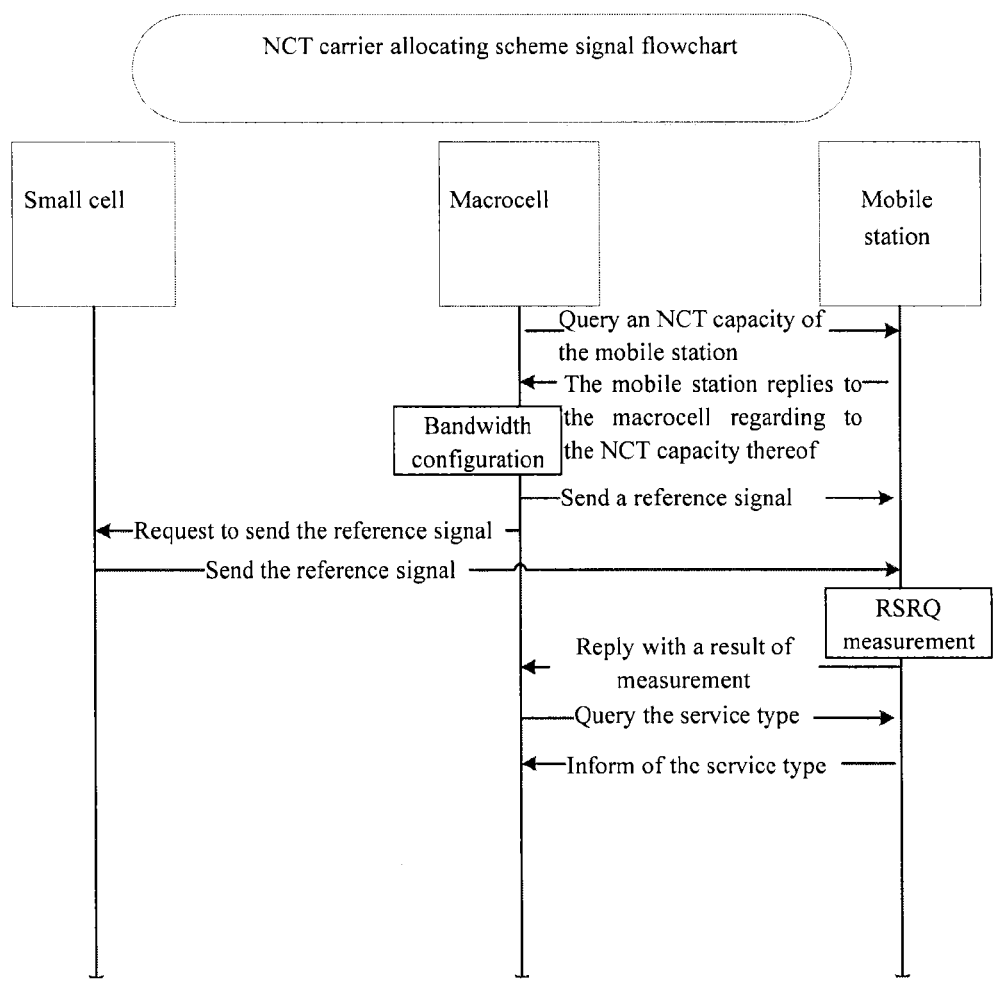
FIG. 4 is a signaling flowchart for acquiring parameter information of the terminal according to a scheme in an embodiment of the present invention.

When a base station needs a newly-added carrier, a signaling interaction among a macrocell base station, a small cell base station and a mobile station may refer to a flow as shown in FIG. 4. As shown in FIG. 4, the concrete process is as below:

First of all, the macrocell queries an NCT capacity of the mobile station (for example, whether the mobile station supports the NCT carrier);

the mobile station replies to the macrocell regarding to the NCT capacity thereof;

the macrocell performs a carrier bandwidth configuration;

the macrocell sends a reference signal to the mobile station;

the macrocell may request the small cell to send the reference signal to the mobile station;

after receiving the reference signal, the mobile station may perform a RSRQ measurement and reply to the macrocell regarding to a result of measurement; and the macrocell queries the service type of the mobile station, and the mobile station informs the macrocell of the service type thereof.

Actually, the sequences of steps as shown in FIG. 4 may be changed as required. For example, according to different judgment sequences of the NCT capacity, the channel quality and the service type of the mobile station, the sequences of steps as shown in FIG. 4 may be accordingly changed.

Actually, no matter a network side device (for example, a base station or the like) is to add a carrier, switch off a carrier or adjust a carrier, it may acquire the parameter information of the terminal in a variety of ways, which are not restricted to the steps as shown in FIG. 4.

Figure 5:
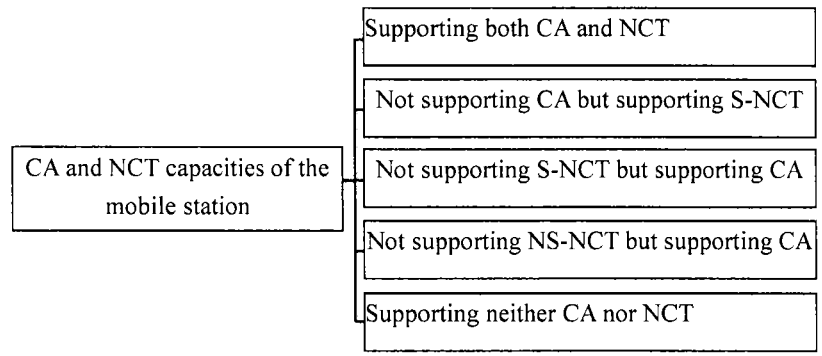
FIG. 5 is a schematic diagram for distinguishing capacity of the terminal (a mobile station) according to a scheme in an embodiment of the present invention.

FIG. 5 shows particular classifications on distinguishing the mobile station capacity. As shown in FIG. 5, CA and NCT capacities of the mobile station include: supporting both CA and NCT, not supporting CA but supporting S-NCT, not supporting S-NCT but supporting CA, not supporting NS-NCT but supporting CA, supporting neither CA nor NCT.

The following will respectively introduce the carrier allocating schemes under the six classifications, i.e., supposing that both the type and the carrier bandwidth of the mobile station have been taken into account, the following will perform a carrier allocation in allusion to the channel indication and the service type.

In the following specific examples to be described, RSRQ serves as an indication of the channel quality. When a base station sends a reference signal to the mobile station, the mobile station will detect the reference signal and all other signals and compute a signal to noise ratio, so as to obtain, for example, RSRQ. Therefore, RSRQ relates to the quality of the channel between the base station and the mobile station, and is directly proportional to the channel quality. In an initial access, the mobile station may measure RSRQs of the macrocell and the small cell. If a RSRQ value of the small cell is higher than that of the macrocell, the "channel indication" is denoted as "strong", otherwise, the "channel indication" is denoted as "weak". If the RSRQ of the small cell is far lower than that of the macrocell, the "channel indication" is denoted as "extremely weak", which indicates that the channel quality of the small cell is very poor, and a UE can only carry out communications with the macrocell. Afterward the UE transmits the "channel indication" to a serving cell. After an initial access, in the moving process, the mobile station may periodically detect the RSRQ values of the macrocell and the small cell. If the RSRQ value of the serving cell is lower than that of other cells and reaches a certain "limit", the mobile station will change the "channel indication". The "limit" mentioned before is a hysteresis judgment, which may overcome a ping-pong effect resulting in frequent handover (ping-pong effect: in a mobile communications system, if signal strength of two base stations within a certain area drastically changes, the terminal may switch over between the two base stations). For example, if the "channel indication" judged by the mobile station is "strong", only when the RSRQ value of the macrocell exceeds the RSRQ value of the small cell by a certain limit may the mobile station change the "channel indication".

(1) A Mobile Station Supporting Both CA and NCT (a Mobile Station as Defined in 3GPP Release 12)

(1.1) Scenarios of Aggregation Among Base Stations

Figure 6:
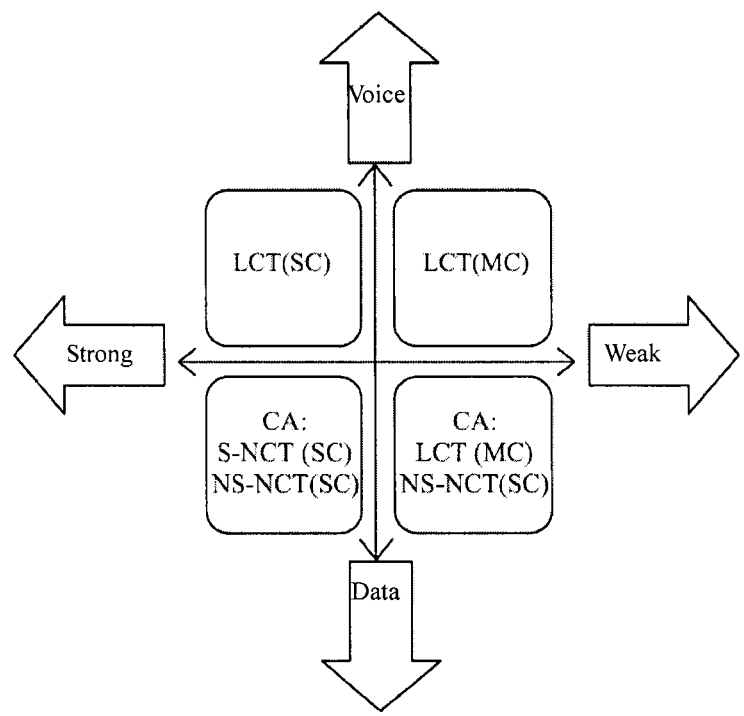

Given that the mobile station is always within a small cell (SC), i.e., that the macrocell (MC) collaborates with the small cell in CA, as shown in FIG. 6, for the voice service, which is sensitive to a handover and insensitive to a rate and an error rate, an LCT is used. Selection of the serving cell depends on the quality of the channel between the small cell and the mobile station. If the channel indication is "strong", the serving cell is the small cell; if the channel indication is "weak", the serving cell is the macrocell.

For the data service, because HTTP and Email services are demanding for an error rate and a rate, the NCT is preferentially used because of its more flexibility and efficiency, higher spectrum efficiency in a frequency band. And carrier aggregation is used in order to achieve a higher transmission rate. If the channel indication is "strong", the small cell serves as the serving cell, an S-NCT serves as an initial access carrier, i.e., a PCC, and the small cell sends an NS-NCT as an SCC so as to obtain a higher transmission rate. If the channel indication is "weak", the macrocell serves as a primary serving cell, and sends an LCT as an initial access carrier, and the small cell sends an NS-NCT which is aggregated with the LCT of the macrocell.

Similarly, in the scenarios as shown in FIGS. 7-13, for a voice service, an LCT carrier is preferentially allocated; and according to RSRP, it is decided whether the LCT is to be allocated to the macrocell or to the small cell. These will not be repeated any more hereinafter.

(1.2) Scenarios of Aggregation within Base Stations

Figure 7:
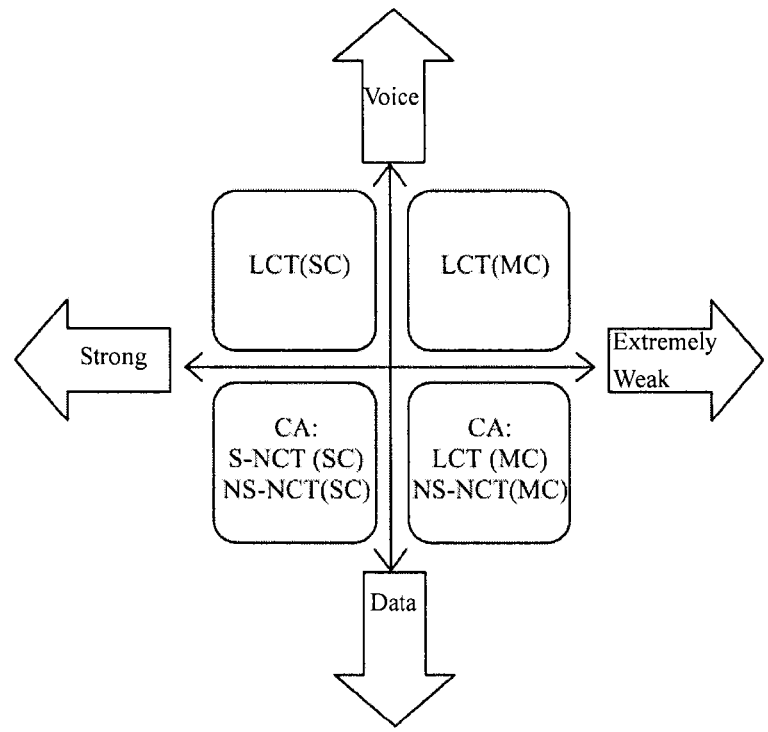

Given that the mobile station may move out of a small cell, i.e., the macrocell needs to perform a CA within a base station, as shown in FIG. 7, when the service type is the data service, the channel indication is "weak", if the mobile station is far enough from the small cell, only a carrier of the macrocell may be used. Therefore, in this case, the scheme is adopted that LCT carrier of the macrocell is aggregated with an NS-NCT carrier of the macrocell.

(2) A Mobile Station not Supporting CA but Supporting S-NCT

Figure 8:
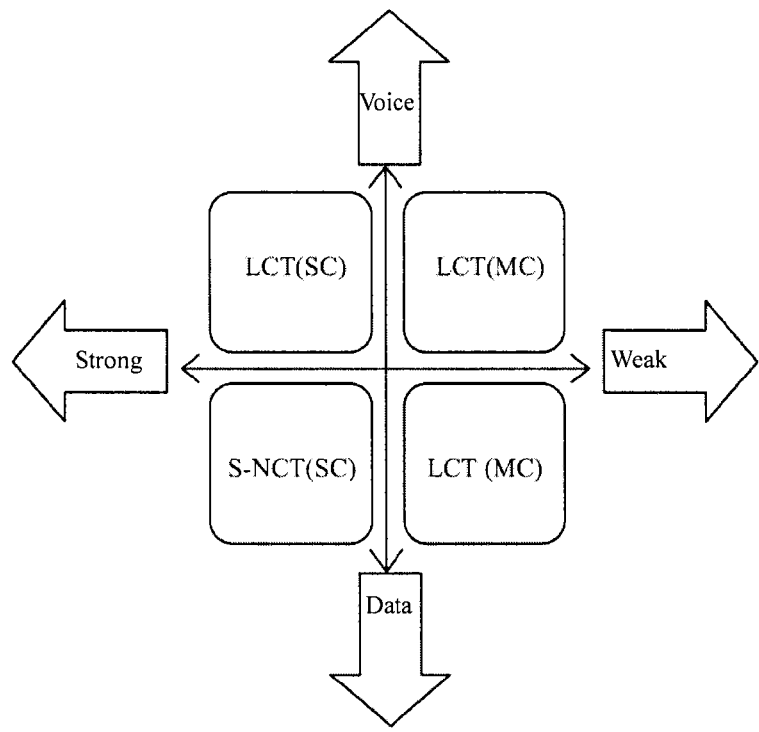

In this example, considering that the mobile station does not have CA capacity but has S-NCT capacity, thus for a voice service, the carrier allocating scheme is the same as above. However, the scheme for the data service is different from the scenarios as described above because CA cannot be used. As shown in FIG. 8, for a data service, if the channel indication is "strong", the small cell sends an S-NCT. If the channel indication is "weak", the macrocell sends an LCT.

(3) A Mobile Station not Supporting S-NCT but Supporting CA (3.1) Scenarios of Aggregation Among Base Stations It is assumed that the mobile station is always within a small cell, i.e., the macrocell collaborates with the small cell in CA. The mobile station has CA capacity but does not have S-NCT capacity, thus for a voice service, the carrier allocating scheme is the same as above. However, the carrier allocating scheme for the data service is different from the scenarios as described above because the S-NCT cannot be used.

Figure 9:
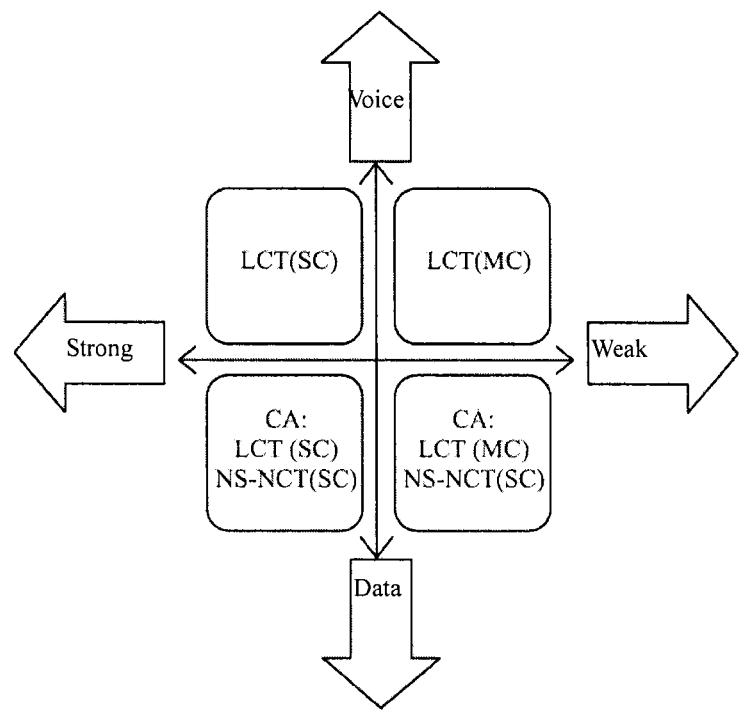

Specifically, as shown in FIG. 9, for the data service, if the channel indication is "strong", the mobile station performs an initial access using the LCT of the small cell, and then aggregates the NS-NCT of the small cell with the LCT of the small cell, the LCT is a PCC and the NS-NCT is an SCC. If the channel indication is "weak", the LCT of the macrocell are aggregated with the NS-NCT of the small cell.

(3.2) Scenarios of Aggregation within Base Stations

Figure 10:
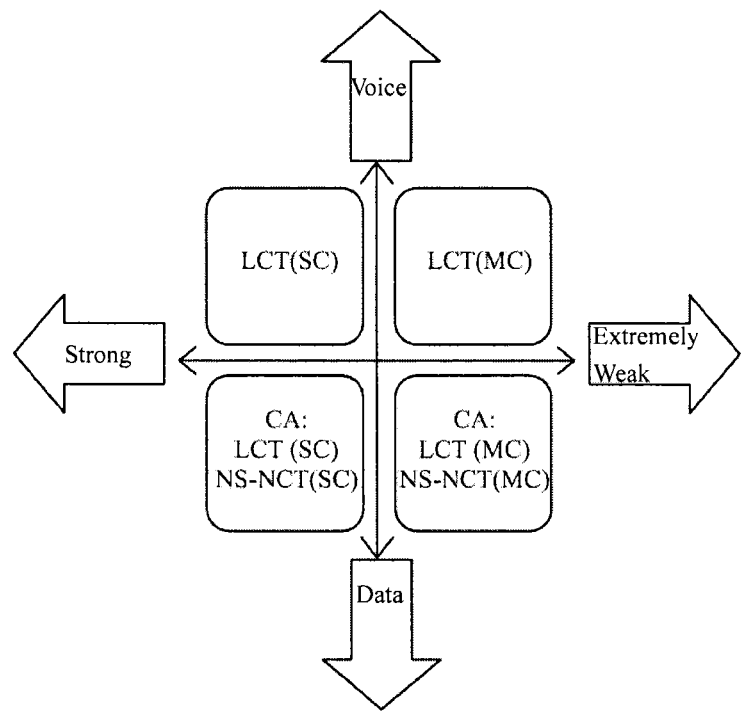

It is assumed that the mobile station may move out of a small cell, i.e., the macrocell needs to perform a CA within a base station. As shown in FIG. 10, when the service type is the data service, the channel indication is "weak" or "extremely weak", if the mobile station is far enough from the small cell; only a carrier of the macrocell may be used. Therefore, the LCT of the macrocell needs to be aggregated with the NS-NCT carrier of the macrocell; if the channel indication is "strong", the LCT of the small cell is aggregated with the NS-NCT carrier of the small cell.

(4) A Mobile Station not Supporting NS-NCT but Supporting CA (4.1) Scenarios of Aggregation Among Base Stations It is assumed that the mobile station is always within a small cell, i.e., the macrocell collaborates with the small cell in CA. The mobile station has CA capacity but does not have NS-NCT capacity. The scheme for the data service is different from the scenarios as described above because the NCT cannot be used.

Figure 11:
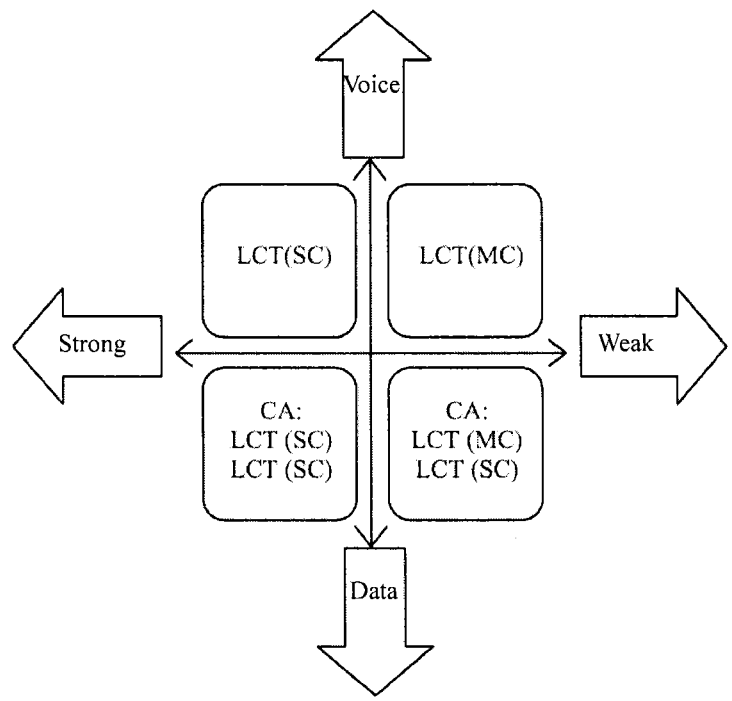
Figure 12:
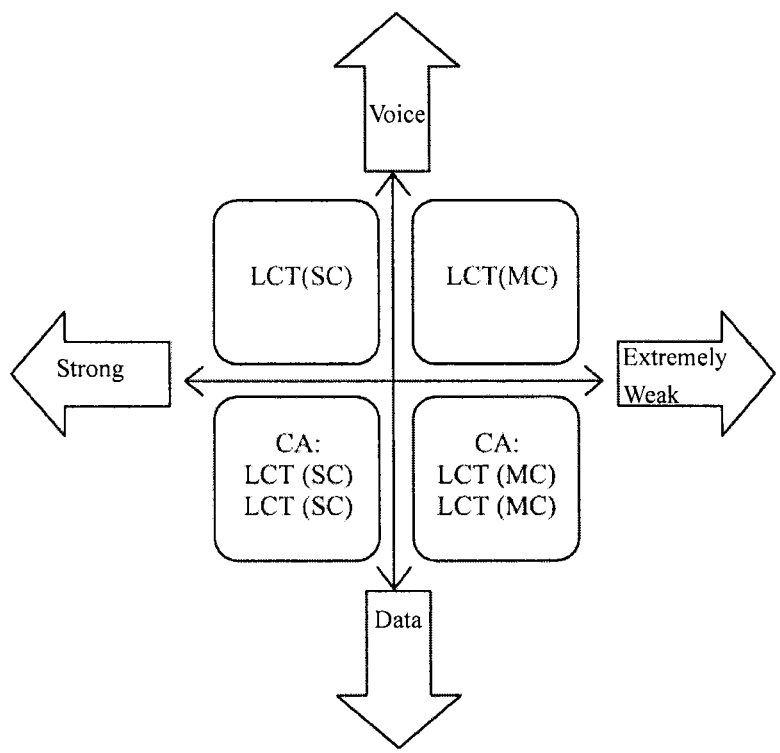

Specifically, as shown in FIG. 11, for the data service, if the channel indication is "strong", the mobile station perform an initial access by using the LCT of the small cell, and then aggregates other LCTs of the small cell with the LCT of the small cell. If the channel indication is "weak", the macrocell sends an LCT as an initial access carrier, and then aggregates the LCT of the small cell.

(4.2) Scenarios of Aggregation within Base Stations

It is assumed that the mobile station may move out of a small cell, i.e., the macrocell needs to perform a CA within a base station. When the service type is the data service, the channel indication is "weak", if the mobile station is far enough from the small cell, only a carrier of the macrocell may be used. Therefore, in this case, the scheme is converted such that an LCT of the macrocell is aggregated with an LCT carrier of the macrocell; if the channel indication is "strong", an LCT of the small cell is aggregated with an LCT carrier of the small cell.

(5) A Mobile Station Supporting Neither CA Nor NCT

It is assumed that the mobile station has neither CA capacity nor NCT capacity. As shown in FIG. 10, because neither an CA nor an NCT can be used, if the channel indication is "strong", the carrier allocating scheme for the data service is the same as that of the voice service, and an LCT of the small cell is used. If the channel indication is "weak", the carrier allocating scheme for the data service is the same as that of the voice service, and an LCT of the macrocell is used.

In addition, when the system needs to add newly a carrier, the added carrier type can be marked according to the capability type and the service type of a UE in the current system, and the concrete marking criterion may be referred to Table 3. For example, if all the users in the system use the LCT, the total sum of scores is the score of the LCT. Scores of the S-NCT and the NS-NCT may be obtained in the same way. By comparing the three scores, the carrier type of which the score apparently higher than the other two scores is set as the newly-added carrier type. If scores of two carrier type are the same or extremely approximate and apparently higher than the third score, the newly-added carrier bandwidth is divided into two parts which are respectively occupied by the two carrier types, according to a certain ratio. If scores of the three carrier type are the same or extremely approximate, the three carrier types respectively occupy a part of the newly-added carrier bandwidth divided according to a certain ratio.

TABLE 3

| | UE type | | | | |
|---|---|---|---|---|---|
| Service type | Supporting both CA and NCT | Not supporting CA but supporting S-NCT | Not supporting S-NCT but supporting CA | Not supporting NS-NCT but supporting CA | Supporting neither CA nor NCT |
| Marking Table for LCT Carrier (2 scores: applicable; 1 score: usable; 0 score: inapplicable) | | | | | |
| Voice type | 2 | 2 | 2 | 2 | 2 |
| Data type | 1 | 1 | 1 | 2 | 2 |
| Marking Table for S-NCT Carrier (2 scores: applicable; 1 score: usable; 0 score: inapplicable) | | | | | |
| Voice type | 1 | 1 | 1 | 1 | 1 |
| Data type | 2 | 2 | 0 | 0 | 0 |
| Marking Table for NS-NCT Carrier (2 scores: applicable; 1 score: usable; 0 score: inapplicable) | | | | | |

TABLE 3-continued

| | UE type | | | | |
|---|---|---|---|---|---|
| Service type | Supporting both CA and NCT | Not supporting CA but supporting S-NCT | Not supporting S-NCT but supporting CA | Not supporting NS-NCT but supporting CA | Supporting neither CA nor NCT |
| Voice type | 1 | 1 | 1 | 1 | 1 |
| Data type | 2 | 2 | 2 | 0 | 0 |

After the type of the newly-added carrier is determined, a carrier needs to be allocated to UEs in the system, and which of the UEs preferentially obtain the carrier depends on the Marking Table. A UE that has 2 scores for the carrier preferentially obtains the carrier, secondly it is a UE that has 1 score for the carrier. The carrier does not need to be allocated to a UE that has 0 score. Among UEs having the same score, the carrier is preferentially allocated to a UE having the maximum user experience gain. For a UE of which small cell channel quality (RSRQ) is superior to a macrocell channel quality, a carrier aggregation is performed in the small cell, i.e., the small cell uses the newly-added carrier as an SCC of the UE, and a primary carrier used by the small cell serves as a PCC of the UE.

For a UE of which small cell channel quality (RSRQ) is inferior to the macrocell channel quality, a carrier aggregation between the macrocell and the small cell is performed, i.e., the small cell uses the newly-added carrier as the SCC of the UE, and the primary carrier used by the macrocell serves as the PCC of the UE.

For a UE of which the small cell channel quality (RSRQ) is far inferior to the macrocell channel quality, a carrier aggregation is performed in the macrocell, i.e., the macrocell uses the newly-added carrier as the SCC of the UE, and the primary carrier used by the macrocell serves as the PCC of the UE.

In addition, because a RSRQ measurement error of an NCT is larger, when an NCT carrier is allocated, it may be automatically descended to an LCT carrier if the retransmission frequency thereof is higher.

And, the carrier allocating scheme may vary with the service type and the channel quality of the UE. When a service of the UE is changed from a voice type to a data type, the carrier will be switched over from an LCT to an NCT. When the channel quality indication of the UE changes from "strong" to "weak" or even "extremely weak", this means that the channel quality of the small cell is gradually deteriorated, the channel quality of the macrocell is gradually meliorated, and the carrier of the UE will be switched over from the small cell to the macrocell.

The above Table 3 merely shows a case where the parameter information of the terminal includes the service type and the capability information. Actually, when the parameter information of the terminal further includes the signal receiving quality of the carriers from different cells, other Marking Tables may be established so as to determine from which cell the newly-added carrier comes. For example, the total sum of scores marked by all of the terminals for each cell may be computed, and a cell having a higher score sets up the newly-added carrier. In addition, two parameters, namely, the capability type of the terminal and the signal receiving quality of a cell may be taken into account so as to determine the type of the newly-added carrier and the corresponding cell.

In addition, in the above description, the Marking Table is mainly used to determine the type of the newly-added carrier or the corresponding cell. In other examples of the present invention, if the newly-added carrier is not taken into account, the marking scheme of the present invention may be directly used for guiding a carrier allocation. For example, scores are marked by all of the terminals for all the existing carrier resources, according to the above aspects, and the corresponding carrier is allocated to the terminal having the highest score.

[Embodiment I]

In this embodiment, the base station has allocated an LCT and an NCT to the currently on-line UE, and the base station needs to newly add a 7 MHz carrier band because loads thereof increase.

The LCT, the S-NCT and the NS-NCT are respectively marked according to the foregoing Marking Table. The concrete operations are as below: supposing that an LCT carrier is to be marked, all UEs in the cell mark it according to UE types and service types, and the total sum of the scores is the score of the LCT. Scores of the S-NCT and the NS-NCT are obtained in the same way.

If the score of the LCT is approximate to that of the NS-NCT and is apparently higher than that of the S-NCT, the 7 MHz carrier may be divided into a 5 MHz LCT carrier and a 2 MHz NS-NCT carrier, or a 3 MHz LCT carrier and a 4 MHz NS-NCT carrier, or a 1.4 MHz LCT carrier and a 5.6 MHz NS-NCT carrier. Which scheme is adopted depends on the retransmission number of the NS-NCT. If the retransmission number is lower, this means that interference at this frequency band is less, and an NS-NCT having a large bandwidth may be used. If the retransmission number is higher, this means that interference at this frequency band is larger, and an NS-NCT having a narrow bandwidth may be used, and the large bandwidth is allocated to the LCT.

When carriers are to be allocated to UEs, a carrier may be preferentially allocated to a UE having the highest score for the carrier.

The channel quality (RSRQ) of the small cell and the channel quality of the macrocell are detected. If the channel quality of the small cell is indicated as "strong", the newly-added carrier is sent by the small cell, serves as an SCC and is aggregated with the PCC of the small cell on the service. If the channel quality of the small cell is indicated as "weak", the newly-added carrier is sent by the small cell, serves as an SCC, and is aggregated with the PCC of the macrocell on the service. If the channel quality of the small cell is indicated as "extremely weak", the newly-added carrier is sent by the macrocell, serves as an SCC, and is aggregated with the PCC of the macrocell on the service.

If the base station detects that NCT retransmission number is higher, UE change carrier from the used NCT to LCT carrier for transmission.

[Embodiment II]

A precondition in this embodiment is as below: the mobile station supports CA but does not support an NCT, the service type of the mobile station is data type, and the current serving cell is the small cell. Two LCT carriers sent by the small cell are aggregated with each other, and the channel indication is "strong". However, the channel indication gradually becomes "weak" as a user is moving.

If the channel indication gradually becomes "weak", this means that the channel of the small cell gradually deteriorates, and the macrocell shall be used for change. The carrier aggregation shall be still used in order to ensure a higher data rate.

In this embodiment, the one of the two LCT carriers with poorer channel quality is switched to the macrocell, while the other one is still in the small cell, and the LCT of the macrocell is a PCC, the LCT of the small cell is an SCC, and the two LCT carriers are aggregated with each other.

[Embodiment III]

A precondition in this embodiment is as below: the mobile station supports an S-NCT but does not support CA, the service type of the mobile station is the voice type, the channel indication is "strong", what is used currently is an S-NCT carrier service of the small cell, and the mobile station suddenly changes service type from voice service to data service.

For data service, NCT is more applicable because it has higher frequency spectrum utilization efficiency. Therefore, in this embodiment, the carrier sent by the small cell is switched from LCT to an S-NCT which is to be sent hereafter.

According to an embodiment of the present invention, a carrier allocating method is further provided.

As shown in FIG. 14, the carrier allocating method according to an embodiment of the present invention includes:

Step S1401: determine a carrier parameter according to parameter information of a terminal, wherein the carrier parameter is configured to indicate a carrier needed by the terminal, and the carrier parameter includes a carrier type (including an LCT and an NCT), wherein the parameter information of the terminal includes: a current carrier configuration and a service type of the terminal; and Step S1403: perform a corresponding carrier allocation on the basis of the determined carrier parameter.

When the carrier parameter is to be determined, a newly-added bandwidth needed by the terminal is determined according to the service type and the current carrier configuration of the terminal, and a carrier type needed by the terminal is determined according to a relation between the bandwidth and a fixed bandwidth of an LCT carrier.

In addition, the service type includes a voice type and a data type; and, when the carrier parameter is to be determined, if the current service type of the terminal is a voice type, the carrier type needed by the terminal is determined as an LCT, and if the current service type of the terminal is a data type, the carrier type needed by the terminal is determined as an NCT.

In addition, the carrier parameter further includes cell information corresponding to the carrier, and the parameter information of the terminal further includes signal receiving quality of the terminal during receiving a signal sent by different cells. Further, when the carrier parameter is to be determined, a cell corresponding to the carrier needed by the terminal is determined according to the signal receiving quality.

Optionally, the signal receiving quality is expressed by a Reference Signal Receiving Quality (RSRQ) and/or a retransmission frequency.

In addition, the parameter information of the terminal further includes capability information of the terminal in supporting a carrier; the capability information includes information indicating that whether the terminal supports Carrier Aggregation (CA) Technology and/or the NCT, and when the carrier type needed by the terminal is to be determined, the capability information can be further referred to.

The NCT further includes a Standalone New Carrier Type (S-NCT) and a Non-Standalone New Carrier Type (NS-NCT), and the capability information further includes information indicating that whether the terminal supports the NS-NCT.

In addition, the parameter information of the terminal should include at least one parameter, and when the carrier parameter is to be determined, a quantitative evaluation of at least one given carrier parameter is made according to all or a part of parameters in the parameter information, an evaluation result of a composite demand of the terminal for the carrier corresponding to each given carrier parameter is obtained according to a quantitative evaluation value corresponding to each carrier parameter involved in evaluation, and a carrier needed by the terminal is determined according to the evaluation result of the composite demand.

In addition, the method may further include: after determining the carrier parameter, determining an expected carrier configuration in the system according to the determined carrier parameter.

The expected carrier configuration may include at least one of the followings:

the number and distribution of carriers in the system, various types of carriers, and various bandwidths of carriers.

The method may further include: before performing a carrier allocation, making, for the current carrier configuration in the system according to the expected carrier configuration, at least one of the followings adjustments: adjusting a type and/or a bandwidth of a carrier in the system, adding a carrier, and switching off a carrier; and When a carrier allocation is to be performed, performing a corresponding carrier allocation according to the adjusted system carrier configuration.

According to an embodiment of the present invention, a carrier allocating apparatus comprising a processing circuitry is further provided.

Figure 15:
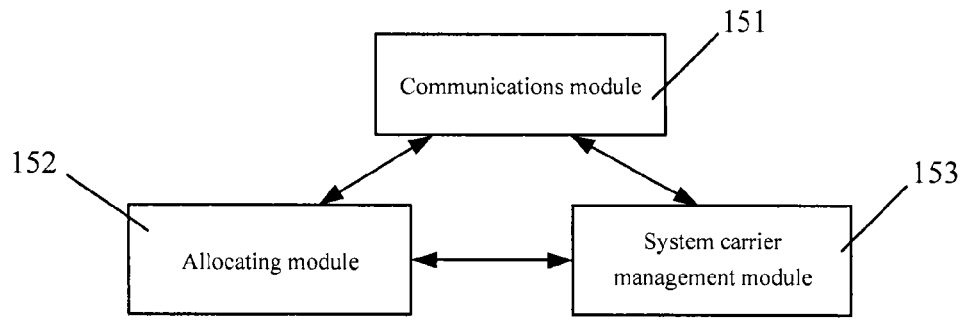
FIG. 15 is a block diagram of the carrier allocating apparatus according to another embodiment of the present invention.

As shown in FIG. 15, the processing circuitry is configured to include according to this embodiment:

a communications module 151, configured to receive carrier demand information reported by multiple terminals, wherein the carrier demand information indicates a demand of the terminals for a carrier, the demand of the terminals for the carrier is obtained on the basis of parameter information of the terminal, and the parameter information includes at least one of the followings: a current carrier configuration and a service type of the terminal, and signal receiving quality of signals from various cells; the carrier demand information includes a carrier parameter of the carrier needed by the terminals, the carrier parameter includes a carrier type (including an LCT and an NCT) and a cell corresponding to the carrier;

a system carrier management module 152, configured to adjust the current carrier configuration in the system according to demands of multiple terminals for the carrier; and an allocating module 153, configured to allocate, on the basis of the adjusted system carrier configuration, the carriers to the terminals.

The demand, received by the communications module 151, of the terminal for a carrier includes the degree of demand of the terminal for at least one type of carrier.

The carrier allocating apparatus as shown in FIG. 15 is similar to the foregoing carrier allocating apparatus by reference to FIG. 2. The difference between both apparatuses is that: the carrier allocating apparatus as shown in FIG. 15 does not determine the demand of the terminal for a carrier, instead receives the demand sent by the terminal.

According to an embodiment of the present invention, a carrier allocating method is further provided.

Figure 16:
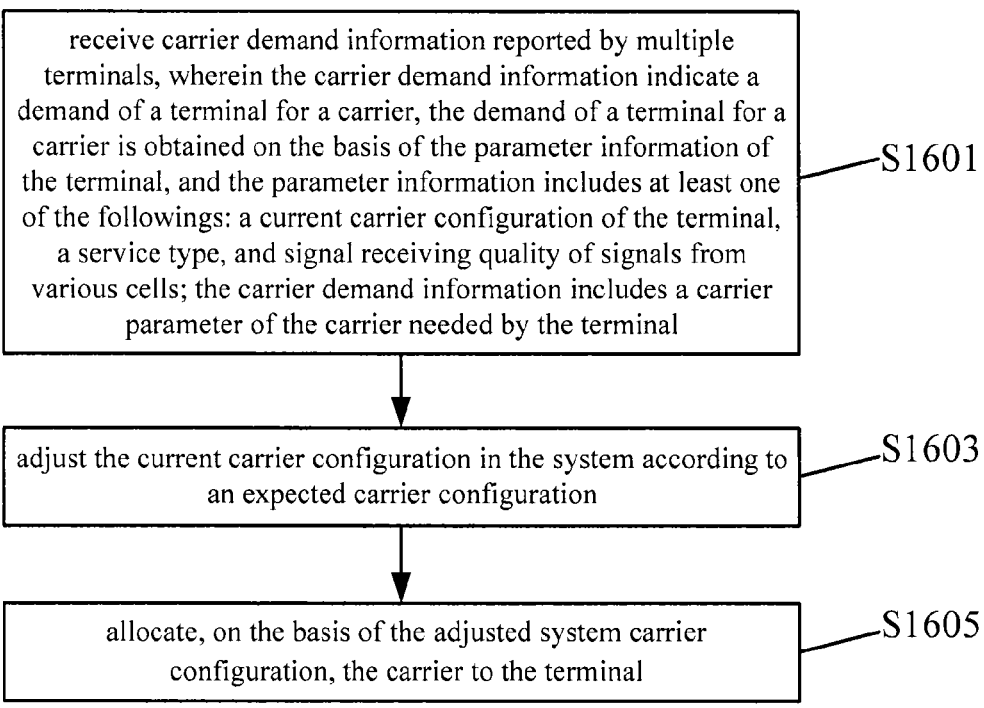
FIG. 16 is a flowchart of the carrier allocating method according to another embodiment of the present invention.

As shown in FIG. 16, the carrier allocating method according to this embodiment includes:

Step S1601: receive carrier demand information reported by multiple terminals; wherein the carrier demand information indicate a demand of the terminals for a carrier, the demand of the terminals for a carrier is obtained on the basis of parameter information of the terminals, and the parameter information includes at least one of the followings: a current carrier configuration and a service type of the terminal, and signal receiving quality of signals from various cells; the carrier demand information includes a carrier parameter of the carrier needed by the terminals, the carrier parameter includes a carrier type (including an LCT and an NCT) and a cell corresponding to the carrier;

Step S1603: adjust the current carrier configuration in the system according to the demands of the multiple terminals for carriers; and Step S1605: allocate, on the basis of the adjusted system carrier configuration, carriers to the terminals.

According to an embodiment of the present invention, a terminal is further provided.

Figure 17:
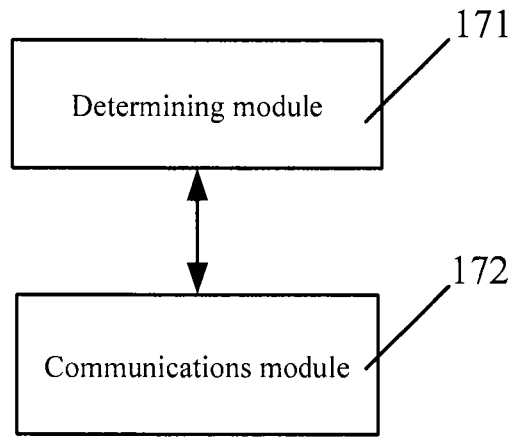
FIG. 17 is a block diagram of the terminal according to an embodiment of the present invention.

As shown in FIG. 17, the terminal according to this embodiment of the present invention includes:

a determining module 171, configured to determine carrier demand information of the terminal according to parameter information of the terminal, wherein the carrier demand information is configured to indicate a demand of the terminal for a carrier, the parameter information includes at least one of the followings: a current carrier configuration and a service type of the terminal, and signal receiving quality of signals from various cells; the carrier demand information includes a carrier parameter of the needed carrier, the carrier parameter includes a carrier type (including an LCT and an NCT) and a cell corresponding to the carrier; and a communications module 172, configured to send the carrier demand information to a network side.

The determining module 171 further determines, according to the service type and the current carrier configuration of the terminal, a newly-added bandwidth needed by the terminal, and determines, according to a relation between the bandwidth and a fixed bandwidth of an LCT carrier, a carrier type needed by the terminal.

In addition, the foregoing service type includes a voice type and a data type; and the determining module 171 is further configured to: determine, when the current service type of the terminal is a voice type, the carrier type needed by the terminal is an LCT, and determine, when the current service type of the terminal is a data type, the carrier type needed by the terminal is an NCT.

In addition, the parameter information of the terminal further includes capability information of the terminal in supporting a carrier; the capability information includes information indicating that whether the terminal supports a Carrier Aggregation (CA) Technology and/or the NCT, and the determining module 171 further determines the carrier type needed by the terminal according to the capability information.

Optionally, the parameter information of the terminal should include at least one parameter, and the determining module 171 is further configured to: make a quantitative evaluation of at least one given carrier parameter according to all or a part of parameters in the parameter information; obtain, according to a quantitative evaluation value corresponding to each carrier parameter involved in evaluation, an evaluation result of a composite demand of the terminal for a carrier corresponding to each given carrier parameter; and determine the carrier needed by the terminal according to the evaluation result of the composite demand.

The terminal as shown in FIG. 17 is equivalent to a terminal having a function for determining a carrier needed by the terminal itself. When the carrier needed by the terminal itself is to be determined, the terminal may also refer to the foregoing method to use the parameter information of its own, and assign a value (mark) to each type of carrier, the concrete process being not repeated any more herein.

According to an embodiment of the present invention, a method for reporting a carrier demand is further provided.

Figure 18:
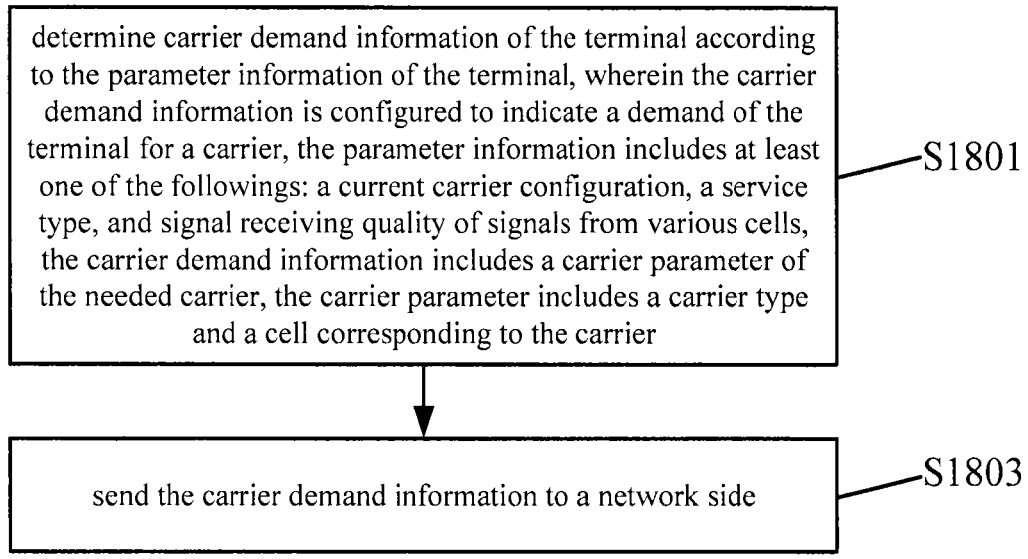
FIG. 18 is a flowchart of the method for reporting a carrier demand according to an embodiment of the present invention.

As shown in FIG. 18, the method for reporting a carrier demand according to this embodiment of the present invention includes:

Step S1801: determine carrier demand information of a terminal according to parameter information of the terminal, wherein the carrier demand information is configured to indicate a demand of the terminal for a carrier, the parameter information includes at least one of the followings: a current carrier configuration and a service type, and signal receiving quality of signals from various cells, the carrier demand information includes a carrier parameter of the needed carrier, the carrier parameter includes a carrier type (including an LCT and an NCT) and a cell corresponding to the carrier; and Step S1803: send the carrier demand information to a network side.

In conclusion, by means of the foregoing technical solutions of the present invention, a demand for a carrier is determined according to parameter information of the terminal, and then the needed carrier is allocated to the terminal, which can effectively improve quality of service of the terminal in a system and improve user experience. In addition, the technical solution of the present invention can be configured to not only perform an initial allocation of a carrier, but also adjust a carrier configuration and reallocate the carrier in case changes in the terminal type, the number of terminals and/or the terminal service occur, thereby effectively adapting to various scenarios.

The above describes the basic principle of the present invention with reference to specific embodiments. However, it is to be pointed out that those of ordinary skill in the art can understand that all of the methods and the apparatuses of the present invention, or any step or unit may be implemented, in any a computing device (including a processor, a storage medium or the like) or network of the computing device, in the form of hardware, firmware, software or combination thereof, which may be implemented by using basic programming skills thereof after those of ordinary skill in the art read the present invention.

Therefore, the objective of the present invention may also be achieved by running a program or a group of programs on any a computing device. The computing device may be a widely-known universal device. Therefore, the objective of the present invention may also be achieved only by providing a program product including a program code for implementing the method or the apparatus. That is, such a program product may also constitute the present invention, and a storage medium storing such a program product may also constitute the present invention. Apparently, the storage medium may be any a widely-known storage medium or any storage medium to be developed in future.

According to another embodiment of the present invention, a storage medium (the storage medium may be a ROM, a RAM, a hard disk, a removable memory or the like) is further provided with a computer program configured to perform a carrier allocation embedded therein. The computer program has code segments configured to execute the following steps: determining a carrier parameter according to parameter information of a terminal, wherein the carrier parameter is configured to indicate a carrier needed by the terminal, and the carrier parameter includes a carrier type (including LCT and an NCT), wherein the parameter information of the terminal includes a current carrier configuration and a service type of the terminal; and carrier allocations corresponding to the determined carrier parameter.

According to another embodiment of the present invention, a storage medium (the storage medium may be a ROM, a RAM, a hard disk, a removable memory or the like) is further provided with a computer program configured to perform a carrier allocation embedded therein. The computer program has code segments configured to execute the following steps: receiving carrier demand information reported by multiple terminals, wherein the carrier demand information indicates a demand of a terminal for a carrier, the demand of a terminal for a carrier is obtained on the basis of parameter information of the terminal, and the parameter information includes at least one of the followings: a current carrier configuration and a service type of the terminal, and signal receiving quality of signals from various cells, wherein the carrier demand information includes a carrier parameter of a carrier needed by the terminal, the carrier parameter includes a carrier type (including an LCT and an NCT) and a cell corresponding to the carrier, and the carrier type; adjusting the current carrier configuration in a system according to demands of the multiple terminals for carriers; and allocating, on a basis of an adjusted system carrier configuration, the carrier to the terminal.

According to another embodiment of the present invention, a storage medium (the storage medium may be a ROM, a RAM, a hard disk, a removable memory or the like) is further provided with a computer program configured to report a demand for a carrier embedded therein. The computer program has code segments configured to execute the following steps: determining carrier demand information of a terminal according to parameter information of the terminal, wherein the carrier demand information is configured to indicate a demand of the terminal for a carrier, the parameter information includes at least one of the followings: a current carrier configuration and a service type, and signal receiving quality of signals from various cells, wherein the carrier demand information includes a carrier parameter of the needed carrier, the carrier parameter includes a carrier type and a cell corresponding to the carrier, and the carrier type includes an LCT and an NCT; and sending the carrier demand information to a network side.

According to another embodiment of the present invention, a computer program is further provided. The computer program has a code segment configured to execute the following carrier allocating steps: determining a carrier parameter according to parameter information of a terminal, where the carrier parameter is configured to indicate a carrier needed by the terminal, and the carrier parameter includes a carrier type, the carrier type includes an LCT and an NCT, where the parameter information of the terminal includes a current carrier configuration of the terminal and a service type; and performing a corresponding carrier allocation on the basis of the determined carrier parameter.

According to another embodiment of the present invention, a computer program is further provided. The computer program has code segments configured to execute the following carrier allocating steps: receiving carrier demand information reported by multiple terminals, wherein the carrier demand information indicates a demand of a terminal for a carrier, the demand of a terminal for a carrier is obtained on the basis of parameter information of the terminal, and the parameter information includes at least one of the followings: a current carrier configuration and a service type of the terminal, and signal receiving quality of signals from various cells, wherein the carrier demand information includes a carrier parameter of a carrier needed by the terminal, the carrier parameter includes a carrier type and a cell corresponding to the carrier, and the carrier type includes an LCT and an NCT; adjusting the current carrier configuration in a system according to demands of the multiple terminals for carriers; and allocating, on a basis of an adjusted system carrier configuration, the carrier to the terminal.

According to another embodiment of the present invention, a computer program is further provided. The computer program has code segments configured to execute the following carrier demand reporting steps: determining carrier demand information of a terminal according to parameter information of the terminal, where the carrier demand information is configured to indicate a demand of the terminal for a carrier, the parameter information includes at least one of the followings: a current carrier configuration and a service type, and signal receiving quality of signals from various cells, where the carrier demand information includes a carrier parameter of the needed carrier, the carrier parameter includes a carrier type and a cell corresponding to the carrier, and the carrier type includes an LCT and an NCT; and sending the carrier demand information to a network side.

According to another embodiment of the present invention, an apparatus is further provided. The apparatus includes a processor configured to execute the following carrier allocating steps: determining a carrier parameter according to parameter information of a terminal, where the carrier parameter is configured to indicate a carrier needed by the terminal, and the carrier parameter includes a carrier type, the carrier type includes an LCT and an NCT, where the parameter information of the terminal includes a current carrier configuration and a service type of the terminal; and performing a corresponding carrier allocation on the basis of the determined carrier parameter.

According to another embodiment of the present invention, an apparatus is further provided. The apparatus includes a processor configured to execute the following carrier allocating steps: receiving carrier demand information reported by multiple terminals, where the carrier demand information indicates a demand of a terminal for a carrier, the demand of a terminal for a carrier is obtained on the basis of parameter information of the terminal, and the parameter information includes at least one of the followings: a current carrier configuration and a service type of the terminal, and signal receiving quality of signals from various cells, where the carrier demand information includes a carrier parameter of a carrier needed by the terminal, the carrier parameter includes a carrier type and a cell corresponding to the carrier, and the carrier type includes an LCT and an NCT; adjusting the current carrier configuration in a system according to demands of the multiple terminals for carriers; and allocating, on a basis of an adjusted system carrier configuration, the carrier to the terminal.

According to another embodiment of the present invention, an apparatus (may be disposed at the foregoing terminal side or serve as a part of the foregoing terminal) is further provided. The apparatus includes a processor configured to execute the following carrier demand reporting steps: determining carrier demand information of a terminal according to parameter information of the terminal, where the carrier demand information is configured to indicate a demand of the terminal for a carrier, the parameter information includes at least one of the followings: a current carrier configuration and a service type, and signal receiving quality of signals from various cells, where the carrier demand information includes a carrier parameter of the needed carrier, the carrier parameter includes a carrier type and a cell corresponding to the carrier, and the carrier type includes an LCT and an NCT; and sending the carrier demand information to a network side.

Figure 19:
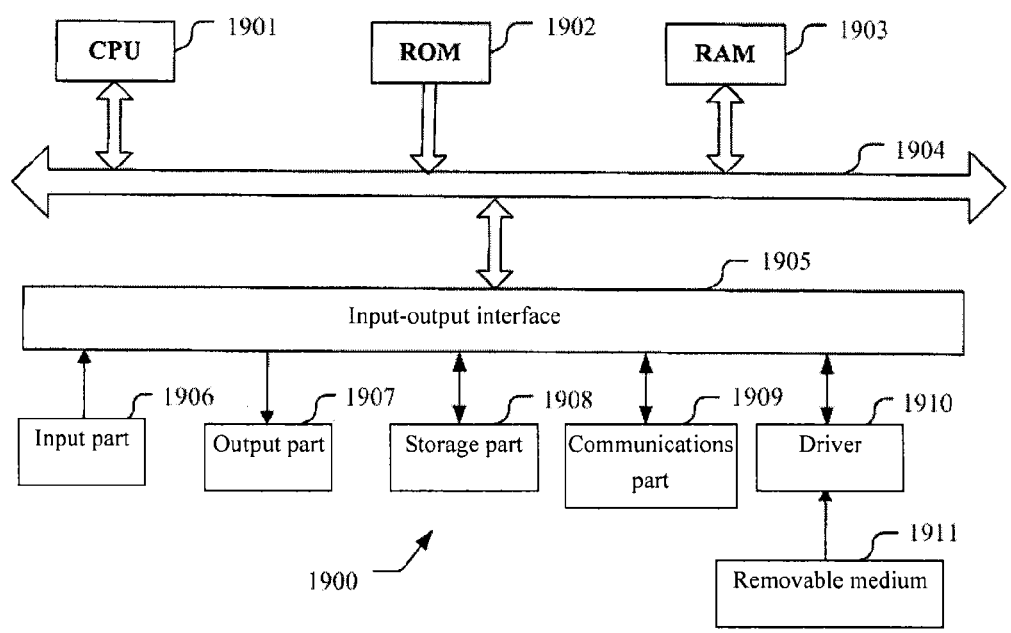
FIG. 19 is an exemplary structural block diagram of a computer for implementing a technical solution of the present invention.

In a case where the embodiments of the present invention are implemented by means of software and/or firmware, a program constituting the software is installed, from a storage medium or network, on a computer having a dedicated hardware structure, for example, a general purpose computer 1900 as shown in FIG. 19. The computer installed with various programs is able to execute various functions, etc.

In FIG. 19, a central processing module (CPU) 1901 is configured to execute various treatments according to a program stored in a read-only memory (ROM) 1902 or a program loaded from a storage part 1908 to a random access memory (RAM) 1903. In the RAM 1903, data required for executing, by the CPU 1901, various treatments or the like is stored as required. The CPU 1901, the ROM 1902 and the RAM 1903 are connected to each other through a bus 1904. An input-output interface 1905 is also connected to the bus 1904.

The following components are connected to the input-output interface 1905: an input part 1906, including a keyboard, a mouse or the like; an output part 1907, including a displayer, for example, a cathode ray tube (CRT) and a liquid crystal display (LCD), and a loudspeaker or the like; a storage part 1908, including a hard disc or the like; and a communications part 1909, including a network interface such as a LAN card, a modem or the like. The communications part 1909 is configured to execute communications processing over network such as Internet.

As required, a driver 1910 is also connected to the input-output interface 1905. A removable medium 1911, such as a magnetic disk, an optical disk, a magneto-optical disk, a semiconductor memory or the like is installed on the driver 1910 as required, so that a computer program read from the removable medium is installed on the storage part 1908.

In a case where software is configured to implement the foregoing processing, the program constituting the software is installed from network such as Internet or a storage medium such as the removable medium 1911.

Those skilled in the art shall understand that this storage medium is not limited to the removable medium 1911 as shown in FIG. 19, which stores a program and may be separated from an apparatus and distributed so as to provide a user with the program. The removable medium 1911 may include, for example, a magnetic disk (including a floppy disk (registered trademark)), an optical disk (including a compact disk read only memory (CD-ROM) and a digital video disk (DVD)), a magneto-optical disk (including a minidisc (MD) (registered trademark)) and a semiconductor memory. Or the storage medium may be a hard disc or the like included in the ROM 1902 and the storage part 1908, and the storage medium stores a program and may be distributed to a user together with the apparatus in which the storage medium is included.

It needs to be pointed out that in the apparatus and the method of the present invention, apparently, various parts or steps may be disassembled and/or reassembled. These disassembly and/or reassembly shall be deemed as equivalent solutions of the present invention. Steps for executing the foregoing processing may be naturally executed according to a time sequence in proper sequence in the specification. However, it does not need to be executed according to the time sequence. Some steps may be parallelly or independently executed.

Although the present invention and advantages thereof are described in detail, it shall be understood various alterations, substitutions and modifications may be made without departing from the spirit and scope of the present invention which is limited the appended claims. Furthermore, terms such as "comprise", "include" or other variants thereof are intended to cover a non-exclusive "comprise" so that a process, a method, a merchandise or a device comprising a series of elements not only includes these elements, but also includes other elements not listed explicitly, or also includes inherent elements of the process, the method, the merchandise or the device. In the case of no more restrictions, elements restricted by a sentence "include a . . ." do not exclude the fact that additional identical elements may exist in a process, a method, merchandise or a device of these elements.

The invention claimed is:

1. A carrier allocating apparatus, comprising processing circuitry, the processing circuitry being configured to:
    determine a carrier parameter according to parameter information of a terminal, wherein the carrier parameter is configured to indicate a carrier needed by the terminal, and the carrier parameter comprises a carrier type, the carrier type comprises a Legacy Carrier Type (LCT) and a New Carrier Type (NCT), wherein the parameter information of the terminal comprises a current carrier configuration and a service type of the terminal; and
    configured to perform, on the basis of the determined carrier parameter, a corresponding carrier allocation.

2. The carrier allocating apparatus according to claim 1, wherein the processing circuitry further determines, according to the service type and the current carrier configuration of the terminal, a newly-added bandwidth needed by the terminal, and determines, according to a relation between the bandwidth and a fixed bandwidth of an LCT carrier, the carrier type needed by the terminal.

3. The carrier allocating apparatus according to claim 1, wherein the service type comprises a voice type and a data type, the processing circuitry is further configured to determine, when the current service type of the terminal is the voice type, the LCT as the carrier type needed by the terminal, and determine, when the current service type of the terminal is the data type, the NCT as the carrier type needed by the terminal.

4. The carrier allocating apparatus according to claim 1, wherein the carrier parameter further comprises a cell information corresponding to the carrier, the parameter information further comprises signal receiving quality of the terminal during receiving signals sent by different cells, and the processing circuitry further determines a cell corresponding to the carrier needed by the terminal according to the signal receiving quality.

5. The carrier allocating apparatus according to claim 4, wherein the signal receiving quality is indicated by at least one of a Reference Signal Receiving Quality (RSRQ) and a retransmission probability.

6. The carrier allocating apparatus according to claim 1, wherein the parameter information of the terminal further comprises capability information of the terminal for supporting carriers; the capability information comprises an information indicating that whether the terminal supports Carrier Aggregation (CA) Technology and/or the NCT, and the processing circuitry further determines the carrier type needed by the terminal according to the capability information.

7. The carrier allocating apparatus according to claim 6, wherein the NCT further comprises a Standalone New Carrier Type (S-NCT) and a Non-Standalone New Carrier Type (NS-NCT), and the capability information further comprises an information indicating that whether the terminal supports the NS-NCT.

8. The carrier allocating apparatus according to claim 1, wherein the parameter information of the terminal comprises a plurality of parameters comprising the current carrier configuration and the service type of the terminal and the processing circuitry is further configured to:
 make a quantitative evaluation of the carrier parameter according to all or a part of the plurality of parameters in the parameter information;
 obtain, according to a value of the quantitative evaluation corresponding to the carrier parameter involved in evaluation, an evaluation result of a composite demand of the terminal for the carrier corresponding to the carrier parameter; and
 determine the carrier needed by the terminal according to the evaluation result of the composite demand.

9. The carrier allocating apparatus according to claim 1, wherein the processing circuitry further determines an expected carrier configuration in a multicarrier communication system according to the determined carrier parameter.

10. The carrier allocating apparatus according to claim 9, wherein the expected carrier configuration comprises at least one of the followings:
 quantity and distribution of carriers in the multicarrier communication system, types of the carriers, and bandwidths of the carriers.

11. The carrier allocating apparatus according to claim 10, wherein the processing circuitry further performs, for the current carrier configuration in the multicarrier communication system according to the expected carrier configuration, at least one of the following adjustments: adjusting the types and/or bandwidths of the carriers in the multicarrier communication system;
 adding a carrier;
 switching off a carrier in the carriers; and
 performing the corresponding carrier allocation according to the adjusted system carrier configuration.

12. A carrier allocating method, comprising:
 determining a carrier parameter according to parameter information of a terminal, wherein the carrier parameter is configured to indicate a carrier needed by the terminal, and the carrier parameter comprises a carrier type, the carrier type comprises a Legacy Carrier Type (LCT) and a New Carrier Type (NCT), wherein the parameter information of the terminal comprises a current carrier configuration and a service type of the terminal; and
 performing a corresponding carrier allocation on the basis of the determined carrier parameter.

13. The carrier allocating method according to claim 12, wherein when the carrier parameter is to be determined, a newly-added bandwidth needed by the terminal is determined according to the service type and the current carrier configuration of the terminal, and the carrier type needed by the terminal is determined according to a relation between the bandwidth and a fixed bandwidth of an LCT carrier.

14. The carrier allocating method according to claim 12, wherein the service type comprises a voice type and a data type; and, when the carrier parameter is determined, if the current service type of the terminal is the voice type, the LCT is determined as the carrier type needed by the terminal, if the current service type of the terminal is the data type, the NCT is determined as the carrier type needed by the terminal.

15. The carrier allocating method according to claim 12, wherein the carrier parameter further comprises a cell information corresponding to the carrier, the parameter information further comprises signal receiving quality of the terminal during receiving signals sent by different cells; and when the carrier parameter is to be determined, a cell corresponding to the carrier needed by the terminal is further determined according to the signal receiving quality.

16. The carrier allocating method according to claim 15, wherein the signal receiving quality is indicated by at least one of Reference Signal Receiving Quality (RSRQ) and retransmission probability.

17. The carrier allocating method according to claim 12, wherein the parameter information of the terminal further comprises capability information of the terminal for supporting carriers; the capability information comprises a information indicating that whether the terminal supports Carrier Aggregation (CA) Technology and/or the NCT, and when the carrier type needed by the terminal is to be determined, it is further determined according to the capability information.

18. The carrier allocating method according to claim 12, wherein the parameter information of the terminal should comprise a plurality of parameters comprising the current carrier configuration and the service type of the terminal , and when the carrier parameter is to be determined, a quantitative evaluation of the carrier parameter is made according to all or a part of the plurality of parameters in the parameter information, an evaluation result of a composite demand of the terminal for the carrier corresponding to the carrier parameter is obtained according to a value of the quantitative evaluation corresponding to the carrier parameter involved in evaluation, and the carrier needed by the terminal is determined according to the evaluation result of the composite demand.

19. The carrier allocating method according to claim 12 further comprising:
 after determining the carrier parameter, determining an expected carrier configuration in a multicarrier communication system according to the determined carrier parameter.

20. The carrier allocating method according to claim 19, wherein the expected carrier configuration comprises at least one of the followings:
 quantity and distribution of carriers in the multicarrier communication system, types of the carriers, and bandwidths of the carriers.

21. A carrier allocating apparatus, comprising processing circuitry, the processing circuitry being configured to:
 receive carrier demand information reported by a plurality of terminals, wherein the carrier demand information indicates a demand of a terminal for a carrier, the demand of the terminal for the carrier is obtained on the basis of parameter information of the terminal, and the parameter information comprises at least one of the followings: a current carrier configuration, a service type, and signal receiving quality of signals from various cells, of the terminal; the carrier demand information comprises a carrier parameter of a carrier needed by the terminal, the carrier parameter comprises a carrier type and a cell corresponding to the carrier, and the carrier type comprises a Legacy Carrier Type (LCT) and a New Carrier Type (NCT);

adjust the current carrier configuration in a multicarrier communication system according to the demand of the plurality of terminals for a carrier; and allocate, on the basis of the adjusted system carrier configuration, a carrier to the terminal.

22. The carrier allocating apparatus according to claim 21, wherein the carrier demand information received by the communications module comprises a degree of demand of the terminal for the carrier corresponding to at least one of the carrier type and the cell corresponding to the carrier.

* * * * *